United States Patent [19]
Sakai et al.

[11] Patent Number: 5,036,730
[45] Date of Patent: Aug. 6, 1991

[54] VEHICLE AUTOMATIC TRANSMISSION CONTROL SYSTEM

[75] Inventors: Ichiro Sakai; Yasuhisa Arai; Hiroki Matsui; Masataka Yamamoto, all of Saitama, Japan

[73] Assignee: Honda Giken Kogyo Kabushiki Kaisha, Tokyo, Japan

[21] Appl. No.: 368,191

[22] Filed: Jun. 16, 1989

[30] Foreign Application Priority Data

Jun. 17, 1988 [JP] Japan .................................. 63-149376
Jun. 17, 1988 [JP] Japan .................................. 63-149377
Nov. 30, 1988 [JP] Japan .................................. 63-303409

[51] Int. Cl.$^5$ ........................ B60K 41/06; B60K 41/12
[52] U.S. Cl. .................................... 74/866; 364/424.1
[58] Field of Search .................. 74/866; 180/170; 364/424.1, 424.01, 164, 807, 426.01, 513

[56] References Cited

U.S. PATENT DOCUMENTS

| | | | |
|---|---|---|---|
| 4,713,764 | 12/1987 | Klatt ................................. | 74/866 X |
| 4,777,585 | 10/1988 | Kokawa et al. ..................... | 364/164 |
| 4,809,175 | 2/1989 | Hosaka et al. ..................... | 180/170 X |
| 4,841,815 | 6/1989 | Takahashi ............................ | 74/866 |
| 4,842,342 | 6/1989 | Takahashi et al. ............... | 364/424.01 |
| 4,852,007 | 7/1989 | Yasunobu et al. ............... | 364/426.01 |
| 4,853,858 | 8/1989 | Kumura .............................. | 74/866 X |
| 4,922,428 | 5/1990 | Takahashi ....................... | 364/426.04 |
| 4,930,084 | 5/1990 | Hosaka et al. ............... | 364/424.01 X |

FOREIGN PATENT DOCUMENTS 60-143133 7/1985 Japan .

OTHER PUBLICATIONS

"*Suri Kagaku*", Fuzzy Expert System by Eiichiro Tazaki, Feb. 1, 1987, pp. 46-55; Japan.
Text of seminar entitled "Fuzzy Theory and Expert System" by Kaoru Hirota, Apr. 20, 1986; Japan.
King et al., "The Application of Fuzzy Control Systems to Industrial Processes", *Automatica*, vol. 13, Pergamon Press, Great Britain, 1977, pp. 235-242.

*Primary Examiner*—Allan D. Herrmann
*Assistant Examiner*—Benjamin Levi
*Attorney, Agent, or Firm*—Lyon & Lyon

[57] ABSTRACT

A system for controlling automatic, multi-step or continuously variable, transmission equipped with a motor vehicle utilizing fuzzy logic. In the system, fuzzy production rules have been prepared based upon an expert driver's judgments and operation made on a vehicle with a manually shifted transmission. Various operating conditions including opening degree of a throttle valve and road speed of the vehicle are detected and from the detected value, various predictions are made such as an appropriateness of vehicle response to a gearshift intended by the driver and engine output change that would occur should the transmission be shifted to a given gear. These measured or estimated value are put on a common scale named universe of discourse and membership values of the rules are successively calculated. Among the rules, one rule is finally selected and according to the gear indicated in the selected rule, the current gear is shifted up or down or is held at the present position, in case of the multi-step transmission. Similarly, the speed ratio in the continuously variable transmission is determined from the selected rule.

11 Claims, 41 Drawing Sheets

Example where current gear position is 3rd

| Gears | 1st | 2nd | 3rd | 4th |
|---|---|---|---|---|
| Post-gearshift Ne | 4000 | 2500 | — | 1800 |
| Gears to shift | -2 | -1 | — | +1 |

| | |
|---|---|
| Minimum gears possible to shift down | -2 |
| Maximum gears possible to shift up | +1 |

FIG.9(a)

| Rule No. | | | | | | | Conclusion | Meaning of rule |
|---|---|---|---|---|---|---|---|---|
| 1 | ΔθTH (WOT/0.1s) | a (km/h/0.1s) | Ne (rpm) | | | | 1 | If cruising at reasonable engine speed is desired, do not shift. |
| 2 | Ne | | | | | | 1 | If engine speed is high, shift up one gear to protect engine. |
| 3 | tSFT (s) | | ΔθTH | | | | 0 | Do not shift shortly after shift operation. |
| 4 | SFT0 | V | θTH (WOT) | | | | −3 | If throttle valve completely closed and vehicle speed very low, shift to first gear. |
| 5 | SFT0 | ← | ← | | | | −2 | ← |
| 6 | SFT0 | ← | ← | | | | −1 | ← |

FIG. 9(b)

| Rule No. | | | | | Conclusion | Meaning of rule |
|---|---|---|---|---|---|---|
| 7 | S_FTO | V (km/h) | θ_TH | | -2 | If throttle valve completely closed and vehicle speed low, shift to second gear. |
| 8 | S_FTO | V | θ_TH | | -1 | ← |
| 9 | S_FTO θ_TH | | Δθ_TH | | 0 | If throttle has returned rapidly in closing direction, presume no desire to change gears and do not shift. |
| 10 | S_FTO | Δa (km/h/0.1s/0.1s) | CT(2nd) | Ne-SFT (rpm) | 1 | Shiftup from first gear to second gear during acceleration is to be carried out; if acceleration has saturated and post-gearshift control toughness is good. |
| 11 | ← | ← | a (km/h/0.1s) | Δθ_TH | 0 | If it is unlikely that vehicle is accelerating, do not implement Rule 10. |
| 12 | ← | Δa | a | Δθ_TH | 0 | If acceleration has not saturated, do not shift. |

FIG.9(c)

| Rule No. | | | | | | Conclusion | Meaning of rule |
|---|---|---|---|---|---|---|---|
| 13 | S_FTO | V (km/h) | | | | | Since it is unnecessary to shift up to second gear at very low speed, do not shift. |
| 14 | S_FTO | Δa / ΔθTH | V | Δa | | | When acceleration force is weak, shift up using vehicle speed. |
| 15 | S_FTO | Δa | CT(3rd) | a | CT(2nd) | | Shiftup from second gear to third gear during acceleration is to be carried out, if acceleration has saturated and post-gearshift control toughness is good. |
| 16 | ← | ← | Ne-SFT | a | | | If it is unlikely that vehicle is accelerating, do not implement Rule 15. |
| 17 | ← | Δa | a | ΔθTH | | | If acceleration has not saturated, do not shift. |
| 18 | ← | Ne | ΔθTH | | | | Since when engine speed is sufficiently high vehicle will accelerate without shifting, do not shift even if throttle operation shows desire to accelerate. |

FIG.9(d)

| Rule No. | | | | | | | Conclusion | Meaning of rule |
|---|---|---|---|---|---|---|---|---|
| 19 | ▲ S_FTO | ▲ ΔθTH | ▲ V | ▲ Δa | ▲ V | | ⊔ 1 | When acceleration force is weak, shift up using vehicle speed. |
| 20 | ← | ← | ⊏ V | ← | ⊏ V | | ⊔ 0 | Even in foregoing case, do not shift up if vehicle speed is not satisfied. |
| 21 | ▲ S_FTO | ▲ ΔθTH | ▲ CT(4th) | ▲ Δa | Ne-SFT | ▲ CT(3rd) | ⊔ 1 | Shiftup from third gear to fourth gear during acceleration is to be carried out if acceleration has saturated and post-gearshift control toughness is good. |
| 22 | ← | ← | ⊏ a | ← | ▲ ΔθTH | | ⊔ 0 | If it is unlikely that vehicle is accelerating, do not implement Rule 21. |
| 23 | ← | ⋈ Δa | ⊐ a | ⋈ | ▲ ΔθTH | | ⊔ 0 | If acceleration has not saturated, do not shift. |
| 24 | ← | ⊓ Ne | ▲ ΔθTH | | | | ⊔ 0 | Since when engine speed is sufficiently high vehicle will accelerate without shifting, do not shift even if throttle operation shows desire to accelerate. |

| Rule No. | | | | | | Conclusion | Meaning of rule |
|---|---|---|---|---|---|---|---|
| 31 | θTH (0 to WOT) | ΔθTH (−1/8 to 0) | a (−0.4 to 0.4) | | | 0 | If preceding state is not one of acceleration, do not shift up. |
| 32 | θTH (0 to WOT) | ΔθTH (−1/8 to 0) | a (−0.4 to 0.4) | CT(4th) | Ne-SFT (0 to 6000) | 1 | If desire to discontinue acceleration and begin cruising is clear and post-gearshift control toughness is good, shift up. |
| 33 | ← | ← | a (−0.4 to 0.4) | | | 0 | If preceding state is not one of acceleration, do not shift up. |
| 34 | SFTO (2,3,4) | θTH / WOT | Ne-SFT (0 to 6000) | V (0 to 100) | | −3 | Kick down. |
| 35 | ← | ← | Ne-SFT (0 to 6000) | V (0 to 100) | | −2 | ← |
| 36 | ← | ← | Ne-SFT (0 to 6000) | V (0 to 100) | | −1 | ← |

| Rule No. | | | | | | Conclusion | Meaning of rule |
|---|---|---|---|---|---|---|---|
| 43 | SFTO | θTH WOT | Ne-SFT | V | | | Kick down. |
| 44 | ← | θTH WOT | ← | | | | ← |

$\tan \theta = \dfrac{h}{l}$

1st gear

2nd gear

3rd gear

4th gear

FIG.13(a)

| Rule No. | | | | | | Conclusion | Meaning of rule |
|---|---|---|---|---|---|---|---|
| 1 | ΔθTH | a (km/h/0.1s) | | Ne (rpm) | | | If cruising at reasonable engine speed is desired, do not shift. |
| 2 | Ne | | | | | | If engine speed is high, shift up one gear to protect engine. |
| 3 | tSFT | | | ΔθTH | | | Do not shift shortly after shift operation. |
| 4 | SFT0 | | | θTH (WOT) | | | If throttle valve completely closed and vehicle speed very low, shift to first gear. |
| 5 | SFT0 | | | ← | | | ← |
| 6 | SFT0 | | | ← | | | ← |

FIG.13(b)

| Rule No. | | | | Conclusion | Meaning of rule |
|---|---|---|---|---|---|
| 7 | | | | -2 | If throttle valve completely closed and vehicle speed low, shift to second gear. |
| 8 | | | | -1 | ← |
| 9 | | | | -1 | If throttle has returned rapidly in closing direction, presume no desire to change gears and do not shift. |
| 10 | | | | 0 | Shiftup from first gear to second gear during acceleration is to be carried out. if acceleration has saturated and post-gearshift control toughness is good. |
| 11 | | | | 1 | If it is unlikely that vehicle is accelerating, do not implement Rule 10. |
| 12 | | | | 0 | If acceleration has not saturated, do not shift. |

FIG.13(c)

| Rule No. | | | | | | Conclusion | Meaning of rule |
|---|---|---|---|---|---|---|---|
| 13 | | | | | | | Since it is unnecessary to shift up to second gear at very low speed, do not shift. |
| 14 | | | | | | | When acceleration force is weak, shift up using vehicle speed. |
| 15 | | | | | | | Shiftup from second gear to third gear during acceleration is to be carried out, if acceleration has saturated and post-gearshift control toughness is good. |
| 16 | | | | | | | If it is unlikely that vehicle is accelerating, do not implement Rule 15. |
| 17 | | | | | | | If acceleration has not saturated, do not shift. |
| 18 | | | | | | | Since when engine speed is sufficiently high vehicle will accelerate without shifting, do not shift even if throttle operation shows desire to accelerate. |

FIG.13(d)

| Rule No. | | | | | | | Conclusion | Meaning of rule |
|---|---|---|---|---|---|---|---|---|
| 19 | S-FTO | ΔθTH | V | V | | CT(3rd) | | When acceleration force is weak, shift up using vehicle speed. |
| 20 | | ← | | ← | | | 0 | Even in foregoing case, do not shift up if vehicle speed is not satisfied. |
| 21 | S-FTO | Δa | CT(4th) | Ne-SFT | | ΔθTH | | Shiftup from third gear to fourth gear during acceleration is to be carried out, if acceleration has saturated and post-gearshift control toughness is good. |
| 22 | ← | Δa | a | ΔθTH | | | 0 | If it is unlikely that vehicle is accelerating, do not implement Rule 21. |
| 23 | ← | Δa | a | ΔθTH | | | 0 | If acceleration has not saturated, do not shift. |
| 24 | ← | Ne | ΔθTH | | | | 0 | Since when engine speed is sufficiently high vehicle will accelerate without shifting, do not shift even if throttle operation shows desire to accelerate. |

FIG. 13(e)

| Rule No. | | | | | Conclusion | Meaning of rule |
|---|---|---|---|---|---|---|
| 25 | S-FTD | ΔθTH | V | ΔθTH | 1 | If vehicle speed is increasing gradually for reason other than acceleration, shift up to fourth gear using vehicle speed. |
| 26 | ← | ← | 50 45 V | ← | 0 | Even in foregoing case, do not shift up if vehicle speed is not satisfied. |
| 27 | S-FTD | Ne | ΔθTH | CT(4th) | 0 | Since when engine speed is sufficiently high vehicle will accelerate without shifting, do not shift even if throttle operation shows desire to accelerate. |
| 28 | θTH | ΔθTH | a | Ne-SFT | 3 | If desire to discontinue acceleration and begin cruising is clear and post-gearshift control toughness is good, shift up. |
| 29 | ← | ← | a | ← | 0 | If preceding state is not one of acceleration, do not shift up. |
| 30 | ← | ΔθTH | CT(4th) | Ne-SFT | 2 | If desire to discontinue acceleration and begin cruising is clear and post-gearshift control toughness is good, shift up. |

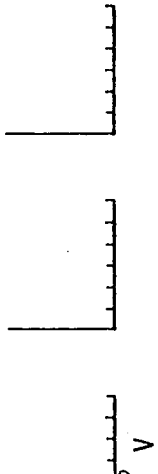

FIG.14(a)

| Rule No. | | | | | | Conclusion | Meaning of rule |
|---|---|---|---|---|---|---|---|
| 1 | | | | | | | If acceleration has saturated and post-gearshift control toughness of vehicle is good, shift up one gear. |
| 2 | | | | | | | If cruising at reasonable engine speed is desired, do not shift. |
| 3 | | | | | | | If desire to cruise is clear and post-gearshift control toughness is good, shift up. |
| 4 | | | | | | | ← |
| 5 | | | | | | | ← |
| 6 | | | | | | | If engine speed is high, shift up one gear to protect engine. |

FIG.14(b)

| Rule No. | | | | | | | Conclusion | Meaning of rule |
|---|---|---|---|---|---|---|---|---|
| 7 | tSFT | | | | | | | Do not shift shortly after shift operation. |
| 8 | SFT0 | V | θTH | | | | | If throttle valve completely closed and vehicle speed very low, shift to first gear. |
| 9 | SFT0 | V | θTH | | | | | ← |
| 10 | SFT0 | V | θTH | | | | | ← |
| 11 | SFT0 | V | θTH | | | | | If throttle valve completely closed and vehicle speed low, shift to second gear. |
| 12 | SFT0 | V | θTH | | | | | ← |

FIG.14(c)

| Rule No. | | | | Conclusion | Meaning of rule |
|---|---|---|---|---|---|
| 13 | θTH | Ne-SFT | V | | Kickdown when throttle is widely opened and vehicle speed is low. |
| 14 | θTH | Ne-SFT | V | | Kickdown when throttle is widely opened and vehicle speed is moderate. |
| 15 | θTH | Ne-SFT | V | | Kickdown when throttle is widely opened and vehicle speed is high. |
| 16 | θTH | Ne-SFT | V | | Kickdown when throttle is moderately opened and vehicle speed is low. |
| 17 | θTH | Ne-SFT | V | | Kickdown when throttle is moderately opened and vehicle speed is high. |
| 18 | θTH | Ne-SFT | ΔθTH | | Kickdown when throttle is slightly opened and throttle opening change is large. |

FIG. 24(a)

| Rule No. | | | | | | Conclusion | Meaning of rule |
|---|---|---|---|---|---|---|---|
| 1 | ΔθTH | a (km/h/0.1s) | Ne rpm | | | γ 0.27 1.0 3.74 | If cruising at reasonable engine speed is desired, hold G/R. |
| 2 | Ne 6000 | | | | | γ 1.56 | If engine speed is high, change G/R slightly toward high side to protect engine. |
| 3 | Current G/R 0.3 4.6 7.0 11.0 | | | θTH (WOT) 1/8 | V 60 | γ 0.27 | If throttle valve completely closed and vehicle speed very low, change G/R large toward low side. |
| 4 | Current G/R 0.3 4.6 7.0 11.0 | | | ← | ← | γ 0.42 | If throttle valve completely closed and vehicle speed very low, change G/R toward low side. |
| 5 | Current G/R 0.3 4.6 7.0 11.0 | | | ← | ← | γ 0.65 | If throttle valve completely closed and vehicle speed very low, change G/R small toward low side. |

| Rule No. | | | | | | | Conclusion | Meaning of rule |
|---|---|---|---|---|---|---|---|---|
| 12 | | | | | | | | Since it is unnecessary to change G/R toward high side at very low speed, do not change G/R. |
| 13 | | | | | | | | When acceleration force is weak, change G/R using vehicle speed. |
| 14 | | | | | | | | Change of G/R at moderate position toward low side during acceleration is to be carried out if acceleration has saturated and control toughness after change is good. |
| 15 | | | | | | | | If it is unlikely that vehicle is accelerating, do not implement Rule 14. |
| 16 | | | | | | | | If acceleration has not saturated, do not change G/R. |
| 17 | | | | | | | | Since when engine speed is sufficiently high vehicle will accelerate without changing G/R, do not change G/R even if throttle operation shows desire to accelerate. |

FIG. 24 (d)

| Rule No. | | | | | | Conclusion | Meaning of rule |
|---|---|---|---|---|---|---|---|
| 18 | Current G/R | ΔθTH | V | Post-speedchange Ne | CT | (triangle 0.27, 1.56, 5.14 r) | When acceleration force is weak, change G/R using vehicle speed. |
| 19 | ← | ← | V | ← | a | (triangle 1.0 r) | Even in foregoing case, do not change G/R if vehicle speed is not satisfied. |
| 20 | Current G/R | Δa | CT | CT | a | (triangle 1.56 r) | Change of G/R small toward high side during acceleration is to be carried out, if acceleration has saturated and control toughness after change is good. |
| 21 | ← | ← | a | ΔθTH | | (triangle 1.0 r) | If it is unlikely that vehicle is accelerating, do not implement Rule 20. |
| 22 | ← | ← | a | ΔθTH | | (triangle 1.0 r) | If acceleration has not saturated, do not change G/R. |
| 23 | ← | Ne | ΔθTH | | | (triangle 1.0 r) | Since when engine speed is sufficiently high vehicle will accelerate without changing G/R, do not change G/R even if throttle operation shows desire to accelerate. |

FIG. 24 (e)

| Rule No. | | | | | Conclusion | Meaning of rule |
|---|---|---|---|---|---|---|
| 24 | Current G/R | ΔθTH | V | a | γ 1.56 3.74 | If vehicle speed increasing gradually for reason other than acceleration, change G/R small toward high side using vehicle speed. |
| 25 | ← | ← | 30 45 | ← | | Even in foregoing case, do not change G/R if vehicle speed is not satisfied. |
| 26 | Current G/R | Ne 6000 | ΔθTH | a | CT | Since when engine speed is sufficiently high vehicle will accelerate without changing G/R, do not change G/R even if throttle operation shows desire to accelerate. |
| 27 | θTH | ΔθTH | a | CT | γ 3.74 | If desire to discontinue acceleration and begin cruising is clear and control toughness after change is good, change G/R small toward high side. |
| 28 | ← | ΔθTH | a | Post-speedchange Ne 6000 | γ 1.0 | If preceding state is not one of acceleration, do not change G/R. |
| 29 | ← | ΔθTH | a | CT Post-speedchange Ne 6000 | γ 2.42 | If desire to discontinue acceleration and begin cruising is clear and control toughness after change is good, change G/R toward high side. |

FIG. 24(f)

| Rule No | | | | | Conclusion | Meaning of rule |
|---|---|---|---|---|---|---|
| 30 | θTH (WOT) | ΔθTH | a (-0.4 to 0.4) | | γ (0.27, 1.0, 3.94) | If preceding state is not one of acceleration, hold G/R. |
| 31 | θTH (WOT) | ΔθTH | a (-0.4 to 0.4) | | γ (1.56) | If desire to discontinue acceleration and begin cruising is clear and control toughness after change is good, change G/R foward high side. |
| 32 | ← | ← | a (-0.4 to 0.4) | | γ (1.0) | If preceding state is not one of acceleration, hold G/R. |
| 33 | Current G/R (3.0, 4.6, 7.0, 11.0) | θTH (WOT) | Post-speedchange Ne (0-6000) | CT | γ (0.27) | Kick down. |
| 34 | ← | ← | Post-speedchange Ne (0-6000) | V (0-100) | γ (0.42) | ← |
| 35 | ← | ← | Post-speedchange Ne (0-6000) | V (0-100) | γ (0.65) | ← |

FIG.24(g)

| Rule No. | | | | Conclusion | Meaning of rule |
|---|---|---|---|---|---|
| 36 | Current G/R | θTH / WOT | Post-speedchange Ne | 0.27 0.42 3.74 γ | Kick down. |
| 37 | Current G/R | ← | ← | 0.42 γ | ← |
| 38 | ← | ← | Post-speedchange Ne | 0.65 γ | ← |
| 39 | ← | ← | Post-speedchange Ne | 0.42 γ | ← |
| 40 | ← | ½ θTH | 40 / Post-speedchange Ne | 0.65 γ | ← |
| 41 | ← | ½ θTH | 50 / Post-speedchange Ne | 0.65 γ | ← |

FIG. 24(h)

VEHICLE AUTOMATIC TRANSMISSION CONTROL SYSTEM

BACKGROUND OF THE INVENTION

1. Field of the Invention

This invention relates to a vehicle automatic transmission control system and more particularly to a vehicle automatic transmission control system which applies fuzzy logic to enable control resembling that based on the judgments and operations of an expert driver in the case of a conventional manually shifted vehicle transmission.

2. Description of the Prior Art

In driving a vehicle equipped with a conventional manually controlled transmission, the driver judges the appropriate time or instant for changing gears on the basis of his observation of the surrounding circumstances and the vehicle operating state and then, when he has determined that the time is right, operates the clutch pedal and the gearshift lever to shift the transmission to what he has decided is the appropriate gear. This is a fairly troublesome operation, especially because it has to be done quite frequently, and to make it unnecessary there has been developed the automatic transmission. Today, the majority of new vehicles sold are equipped with automatic transmissions. The control system for one type of automatic transmission includes a shift valve as one member of a hydraulic circuit. To one side of this valve there is applied a throttle pressure proportional to the degree of opening of the throttle and to the other side there is applied a governor pressure proportional to the vehicle speed, and gear changing is carried out automatically by supplying/cutting off hydraulic pressure to/from a gear clutch in accordance with the ratio between the two pressures. More recently, this type of control has been replaced with an electronic control system employing a microcomputer which has a gearshift program stored in a memory thereof. In this system, the degree of throttle opening and the vehicle speed are used as address data for retrieving the proper time for changing gears from the gearshift program and then a solenoid valve is energized/de-energized accordingly to drive the shift valve so as to cause it to shift the transmission.

In the conventional automatic transmission the time for changing gears is determined solely on the basis of the degree of throttle opening and the vehicle speed instead of in accordance with the judgment and operations of the driver himself. This inevitably causes unnatural gear changing. For example, when the vehicle is running up hill and the driver returns the throttle opening to that for cruising on level ground, the transmission will shift up, depending on the vehicle speed at the time. As a result, the amount of reserve power available will become insufficient, making it necessary for the driver to press down on the accelerator pedal again, which will cause the transmission to shift down. This shiftup, shiftdown cycle will repeat itself, giving the driver the impression of being busy. This same problem also arises in such cases as when the vehicle is used to pull a camper, when the weight of the vehicle changes because of a change in the weight of the load or the like, or when the engine charging efficiency declines during driving at high altitudes.

The answer to why the driver presses down on the accelerator pedal and thus opens the throttle valve is simply that he wants to accelerate and expects that when he depresses the accelerator pedal further the vehicle will respond to his desire. Stated in another way, the reason that the aforesaid problem arises is that the control system issues a gearshift command notwithstanding that the vehicle has been deprived of sufficient controllability by a decrease in reserve engine power. Thus, the problem arises because the control system does not do what it should do, namely, to accurately ascertain the motive force and the driving resistance and shift up only after confirming that the motive force is greater than the driving resistance, i.e. after confirming that there is reserve force available.

A way for overcoming this problem was recently proposed in Japanese Laid-open Patent Publication No. 60(1985)-143133. According to the proposed technique, the amount of torque desired by the driver is determined from the amount of depression of the accelerator pedal and the desired acceleration is calculated by subtraction of the pre-calculated climbing resistance. Further, the one among a plurality of pre-prepared optimum fuel-economy gearshift diagrams which is best matched to the calculated climbing resistance is selected, the degree of opening of the throttle is controlled on the basis of data obtained from the constant acceleration locus on the selected gearshift diagram, and the new degree of throttle opening and the vehicle speed are used as address data for determining from the gearshift diagram what gearshift operation should be carried out for maintaining the acceleration prior to the change in the degree of throttle opening.

With this prior art method, however, while the gearshift judgment is made with consideration being given to the torque desired by the driver, it is after all made solely on the basis of a predetermined gearshift diagram and thus is able to respond only to preset conditions. What is more, as in the earlier controls, this method also determines the gearshift timing solely on the basis of the degree of throttle opening and the vehicle speed and in this point it has the same shortcomings as the earlier controls.

In other words, if the vehicle were one with a manually shifted transmission, the driver would have been aware that he was driving up hill at the time of changing gears and thus avoided making an improper shiftup operation. That is, because he has a grasp of the surrounding circumstances and other aspects of the vehicle operation, the driver of the vehicle with the manually shifted transmission would be aware of the magnitude of the motive force and would also anticipate the increase/decrease in tractive force apt to result if he should shift gears. He would thus decide when to shift gears by selection from among the various rules he has learned through his driving experience. What this means is that the aforesaid inconvenience of the conventional control arises because the judgments and operations of the human driver are ignored, i.e. not reflected in the control. More specifically, in the conventional vehicle gearshift control systems the gearshift timing is, as a basic principle, decided mechanically from the degree of throttle opening and the vehicle speed, and thus is not capable of determining this timing on the basis of a large number of vehicle operation variables. As a result, the aforesaid problems cannot be avoided. What is more, the situation described in the foregoing is true not only of multi-step transmissions but also of continuously variable transmissions. This is because the continuously variable transmission also varies the speed ratio according to the running state of the vehicle and in this point is no different than the multi-step transmission. In this specification, therefore, the term "gearshift" is sometimes used to mean both the changing of gear position in a multi-step transmission and the changing of the transmission ratio (speed ratio) in the continuously variable transmission.

SUMMARY OF THE INVENTION

It is therefore an object of the invention to provide a vehicle automatic transmission control system which overcomes the drawbacks of the prior art.

Another object of the invention is to provide a vehicle automatic transmission control system which applies fuzzy logic for incorporating in its system of automatic transmission control the judgments and operations of the driver of a vehicle with a manually shifted transmission, whereby gearshift judgments resembling those made at the volition of a human being become possible.

Another object of the invention is to provide a vehicle automatic transmission control system of the aforesaid type which can be applied for the control of both multi-step transmissions and continuously variable transmissions.

For realizing the aforesaid objects, the present invention provides a system for controlling a vehicle automatic transmission, comprising; first means for detecting operating condition of the vehicle including engine speed, degree of throttle opening, change in the throttle opening degree, vehicle speed and change in the vehicle speed, second means for predicting with respect to gears to which it is possible to shift from the gear currently engaged, change in the vehicle operating condition, including change in reserve motive force available calculated from a grade of the road surface on which the vehicle is traveling and the engine speed, which would occur upon shifting to each of such gears and third means for establishing a membership function on the detected values and the predicted value. Fourth means is provided for carrying out fuzzy reasoning on the basis of the detected values and the predicted value using the membership function assigned thereto, to determine a gear to be engaged and in response to the determined result actuator means is provided for driving a gearshift mechanism. Similar system is provided for controlling a continuously variable transmission of a vehicle.

BRIEF DESCRIPTION OF THE DRAWINGS

These and other objects and advantages of the invention will be more apparent from the following description and drawings, in which:

FIGS. 9(a) to 9(h) are charts for explaining the fuzzy production rules of FIG. 8;

Figure 13F:
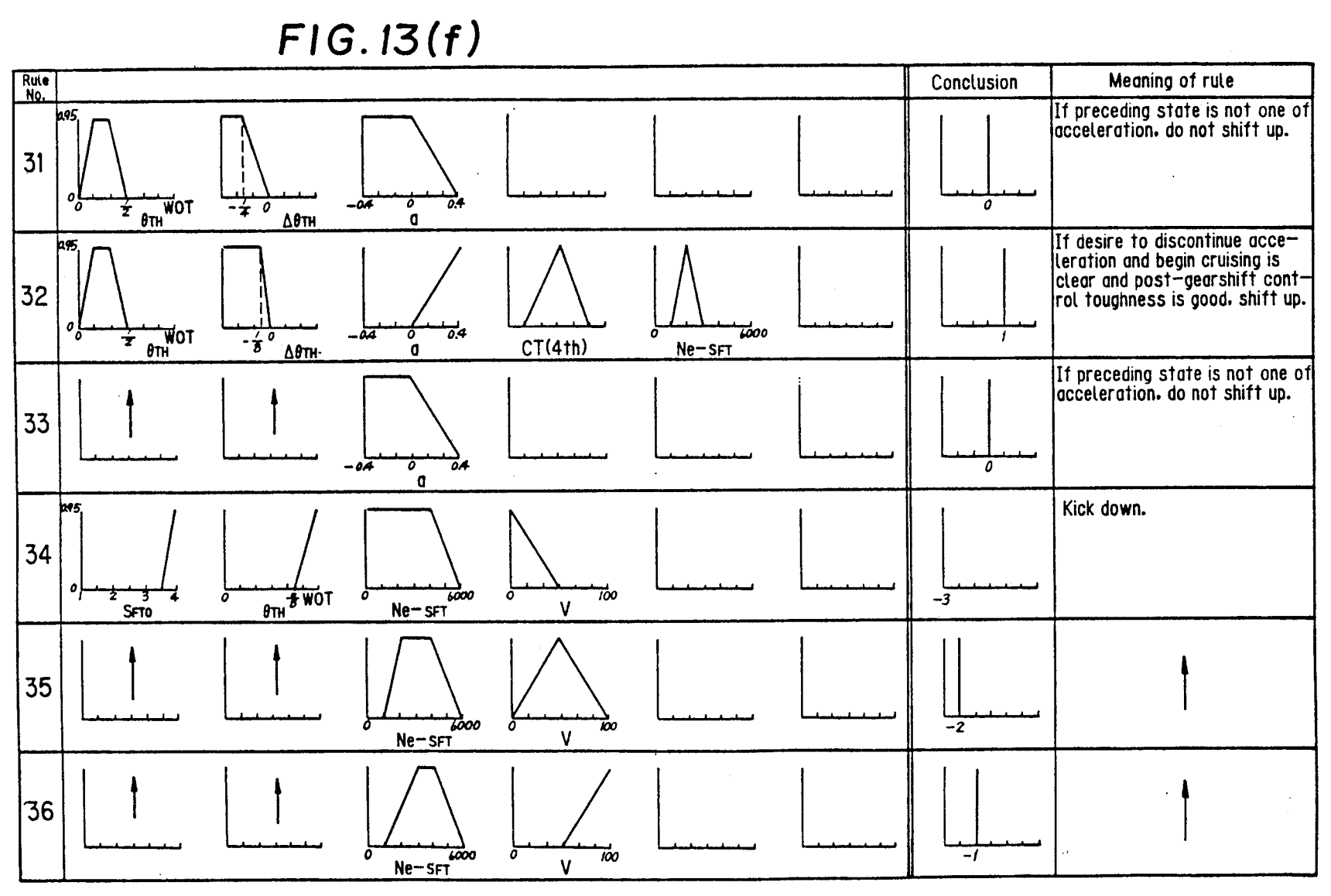
Figure 13G:
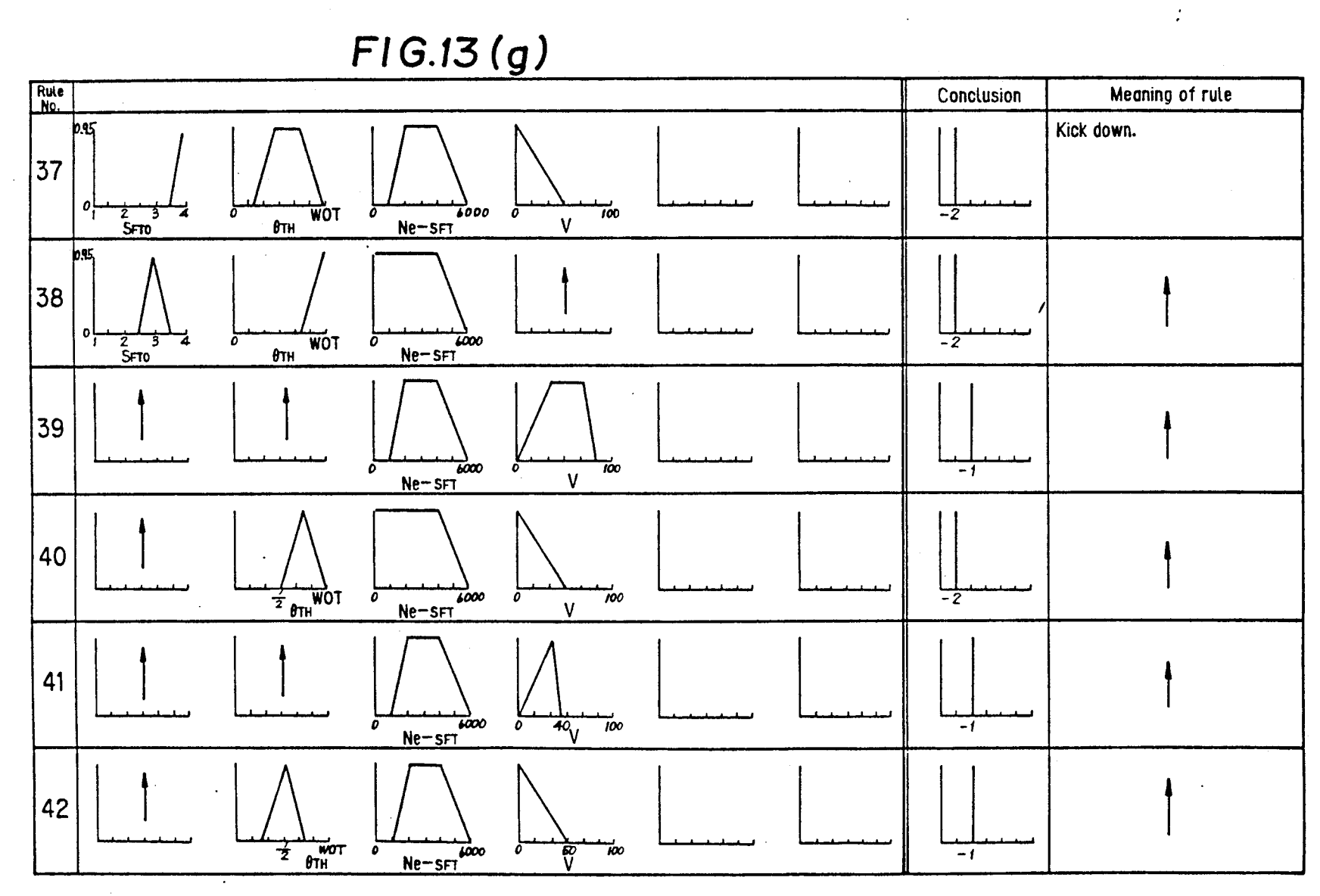

FIGS. 13(a) to 13(h) are charts for explaining the fuzzy production rules used second embodiment of the invention;

FIGS. 14(a) to 14(c) are charts for explaining the fuzzy production rules used in a third embodiment of the invention;

Figure 24B:
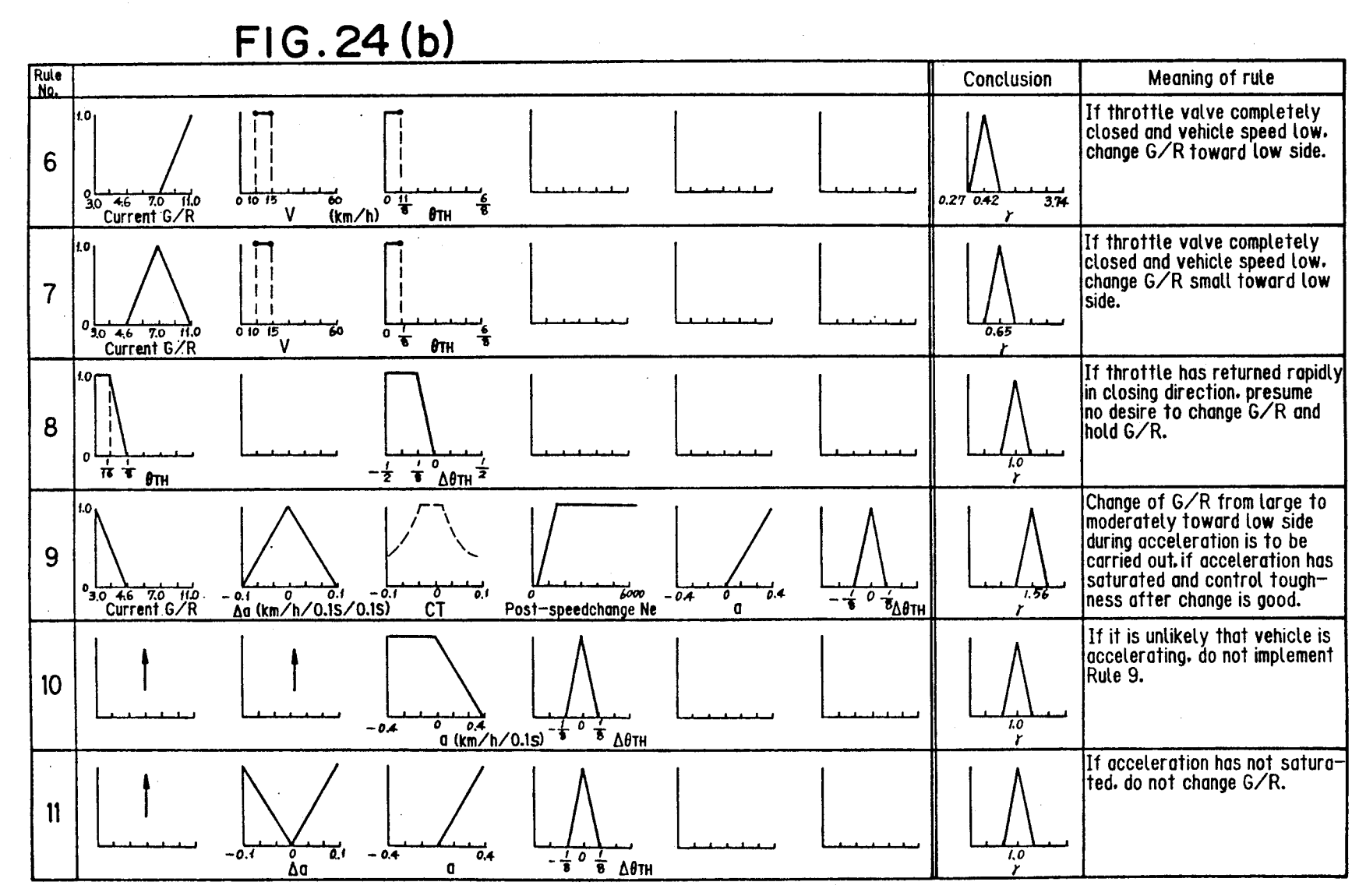
Figure 24H:
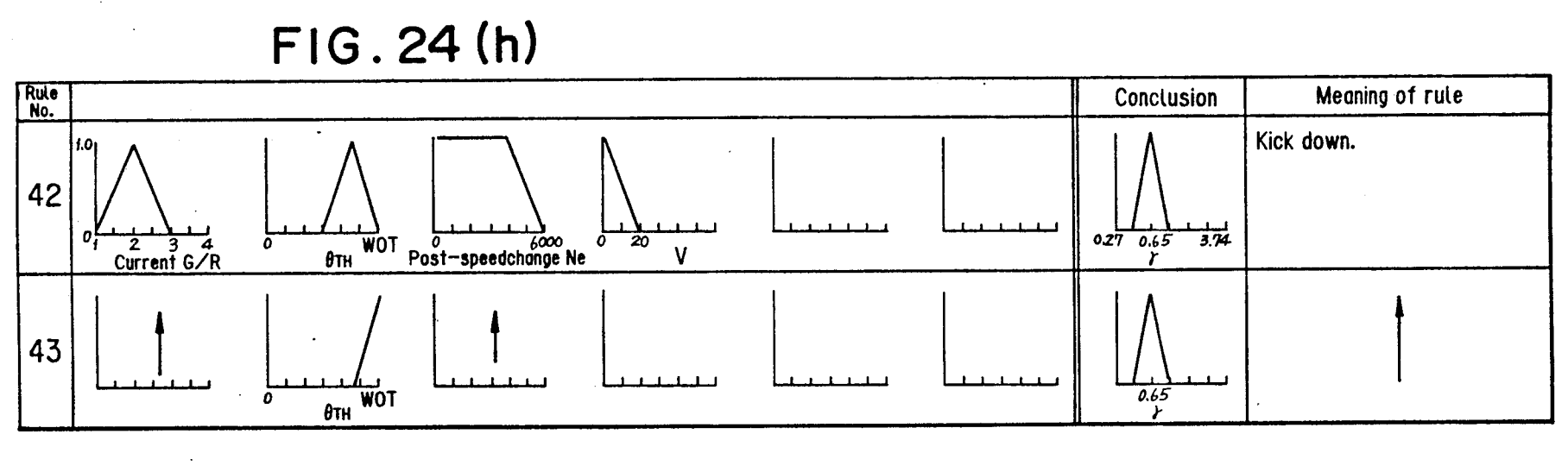

FIGS. 24(a) to 24(h) are charts for explaining the fuzzy production rules used in the fourth embodiment.

DETAILED DESCRIPTION OF THE PREFERRED EMBODIMENTS

Embodiments of the invention will now be described with reference to the attached drawings.

Figure 1:
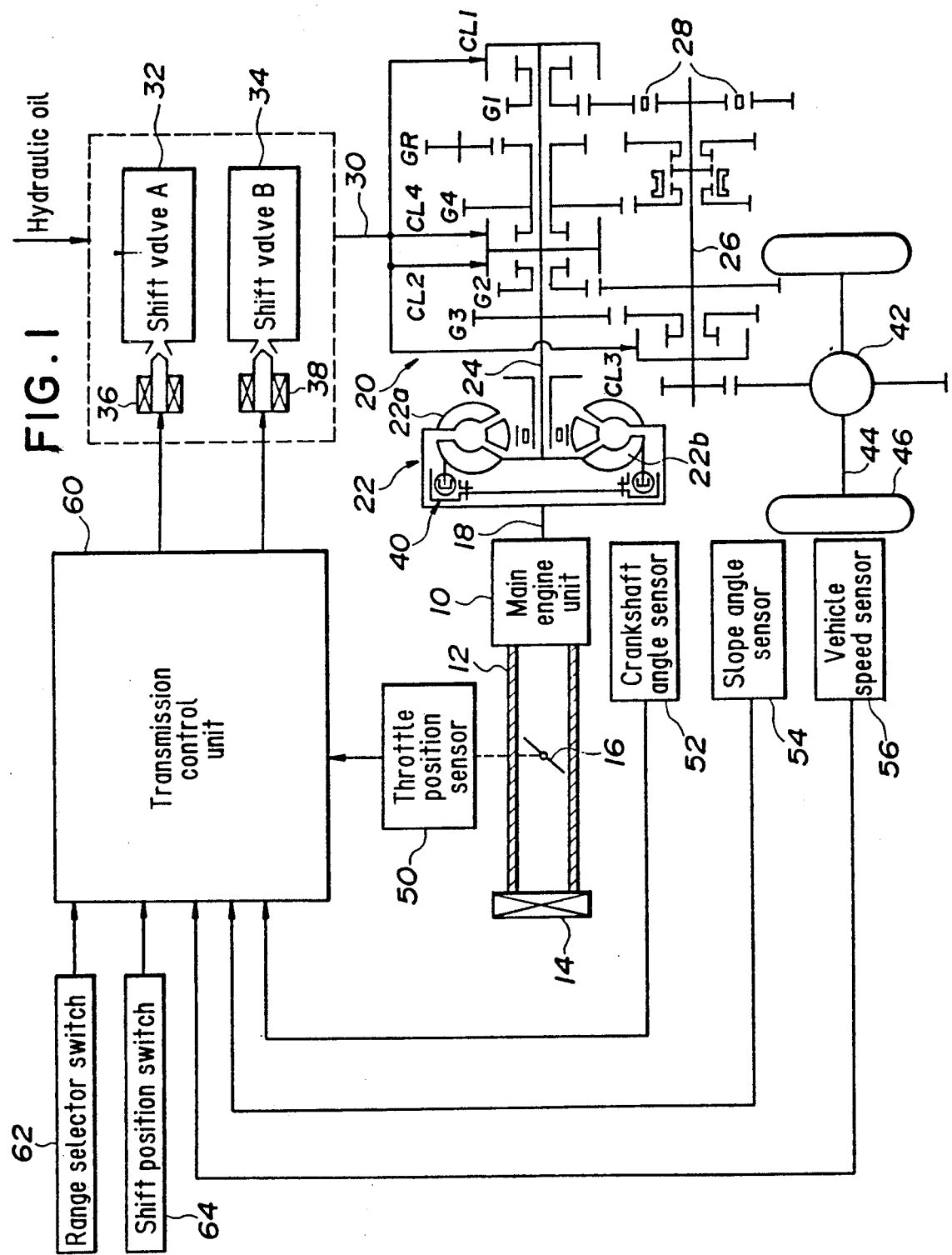
FIG. 1 is a schematic diagram showing the overall arrangement of the vehicle automatic transmission control system according to the present invention.

FIG. 1 is a schematic diagram showing the overall arrangement of the vehicle automatic transmission control system according to the present invention, in which the reference numeral 10 denotes the main unit 10 of an internal combustion engine. The main engine unit 10 is connected with an air intake passage 12 having an air cleaner 14 attached to its far end. The flow rate of the intake air supplied to the main engine unit 10 via the air cleaner 14 and the air intake passage 12 is controlled by a throttle valve 16 linked with and operated by means of an accelerator pedal (not shown) located on the vehicle floor in the vicinity of the driver's seat. A fuel injection valve (not shown) for supplying fuel to the engine is provided at an appropriate portion of the air intake passage 12 in the vicinity of the combustion chamber (not shown). The intake air mixed with the fuel enters the combustion chamber and, after being compressed by a piston (not shown), is ignited by a spark plug (not shown). The fuel-air mixture burns explosively and drives the piston. The driving force of the piston is converted into rotating motion which is made available at an engine output shaft 18.

The stage following the main engine unit 10 is a transmission 20. The output shaft 18 is connected with a torque converter 22 of the transmission 20 and is linked with a pump impeller 22a thereof. A turbine runner 22b of the torque converter 22 is connected with a main shaft 24 (the transmission input shaft). A countershaft 26 (the transmission output shaft) is provided in parallel with the main shaft 24 and between the two shafts there are provided a first speed gear G1, a second speed gear G2, a third speed gear G3, a fourth speed gear G4 and a reverse gear GR, and these gears are provided respectively with multi-plate hydraulic clutches CL1, CL2, CL3 and CL4 (the clutch for the reverse gear is omitted from the drawing in the interest of simplicity). The first speed gear G1 is further provided with one-way clutches 28. To these hydraulic clutches is connected a hydraulic line 30 which interconnects a source of hydraulic pressure and a tank (neither shown). A shift valve A (32) and a shift valve B (34) are provided in the hydraulic line 30. The positions of the two switch valves are changed by the energization/deenergization of respective solenoids 36 and 38, whereby the supply/removal of hydraulic pressure to/from the aforesaid clutches is controlled. The torque converter 22 has a lock-up mechanism 40, whereby the turbine runner 22b and the output shaft 18 can be directly connected in accordance with a command from a control unit to be explained later. Moreover, the countershaft 26 is connected with a rear axle 44 through a differential 42. The rear axle 44 has rear wheels 46 at its opposite ends. The main engine unit 10, transmission 20 and differential 42 are mounted on a chassis (not shown) which, in turn, has a frame mounted thereon, thus constituting the vehicle.

In the vicinity of the throttle valve 16 of the air intake passage 12 there is provided a throttle position sensor 50 (constituted as a potentiometer or the like) for detecting the degree of opening of the throttle valve 16. In the vicinity of a rotating member of the main engine unit 10, e.g. near a distributor thereof, there is provided a crankshaft angle sensor 52 constituted as an electromagnetic pickup or the like. The crankshaft angle sensor 52 detects the position of the piston in terms of the crankshaft angle and produces a signal once every prescribed number of degrees of crankshaft rotation. At an appropriate position on the vehicle frame (not shown) there is provided a slope angle sensor 54 for detecting the inclination of the vehicle and thus the grade of the road surface on which the vehicle is traveling, while at an appropriate location near the transmission 20 there is provided a vehicle speed sensor 56 constituted as a reed switch or the like for detecting the running road speed of the vehicle. The outputs of the sensors 50, 52, 54 and 56 are sent to a transmission control unit 60. The transmission control unit 60 also receives an output from a range selector switch 62 for detecting the selected position of a range selector and an output from a shift position switch 64 for detecting the selected shift (gear) position.

Figure 2:
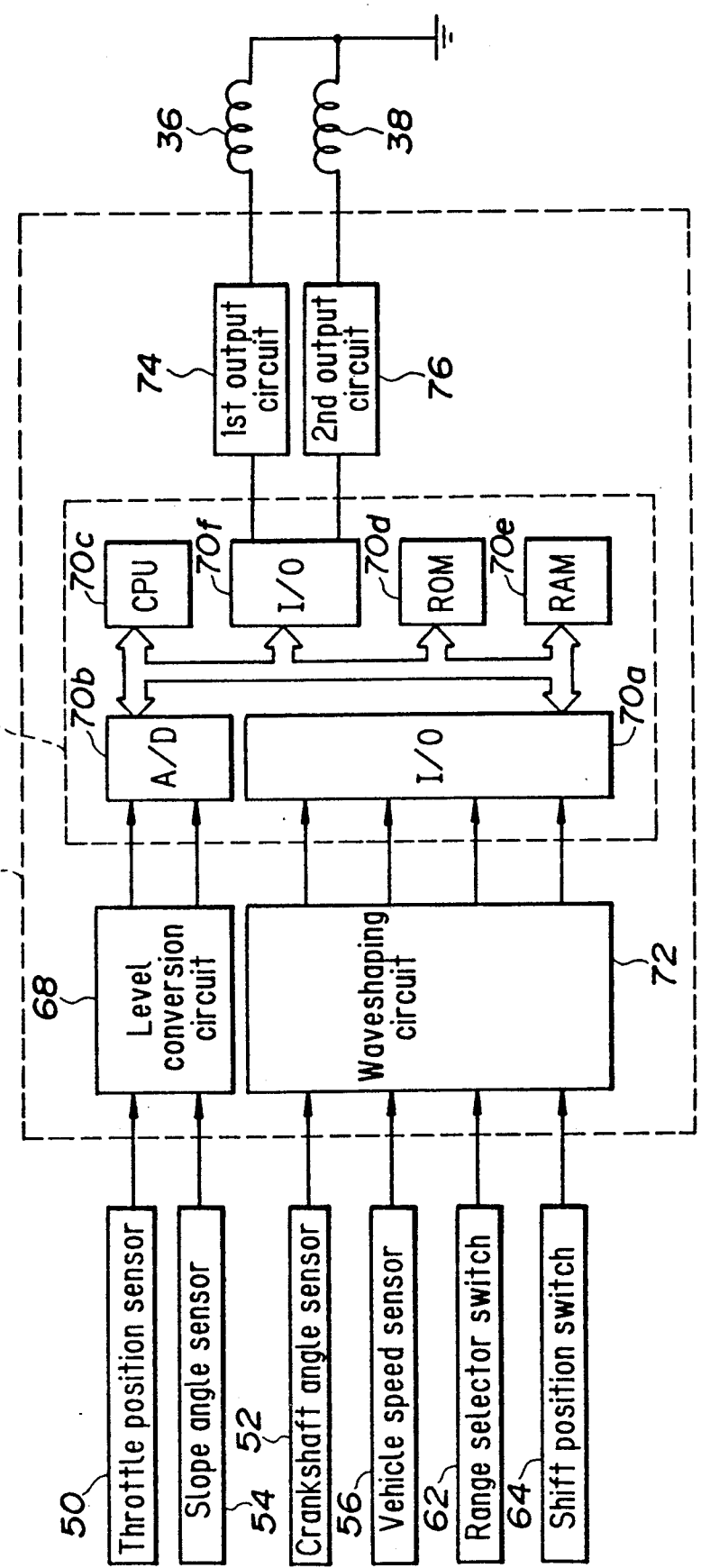
FIG. 2 is a block diagram showing the arrangement of a control unit in the system.

FIG. 2 is a block diagram showing the transmission control unit 60 in detail. As shown in this figure, the outputs from the throttle position sensor 50 and the slope angle sensor 54 which are input to the transmission control unit 60 are first sent to a level conversion circuit 68 where it is amplified to an appropriate level and the amplified signal is forwarded to a microcomputer 70. The microcomputer 70 has an input port 70a, an A/D converter 70b, a CPU 70c, a ROM 70d, a RAM 70e, an output port 70f as well as a group of registers and a group of counters (neither shown). The output from the level conversion circuit 68 is input to the A/D converter 70b whereby it is converted into a digital value, and the digital value is temporarily stored in the RAM 70e. The outputs from the crankshaft angle sensor 52 and the like input to the transmission control unit 60 are first waveshaped in a waveshaping circuit 72 and then input to the microcomputer through the input port 70a to be temporarily stored in the RAM 70e. On the basis of these raw measured values and other computed values derived therefrom, the CPU 70c determines a gearshift command value, as will be explained later. The determined gearshift command value is sent through the output port 70f to a first output circuit 74 and/or a second output circuit 76 which energize/deenergize the solenoids 36 and 38 accordingly so as to change or hold the gear position. This shifting of gears can be conducted, for example, such that fourth speed gear is engaged when both of the solenoids are deenergized (off). The operation of solenoids to shift a transmission is, however, well known and not being a feature of the present invention, will not be explained here.

Figure 3:
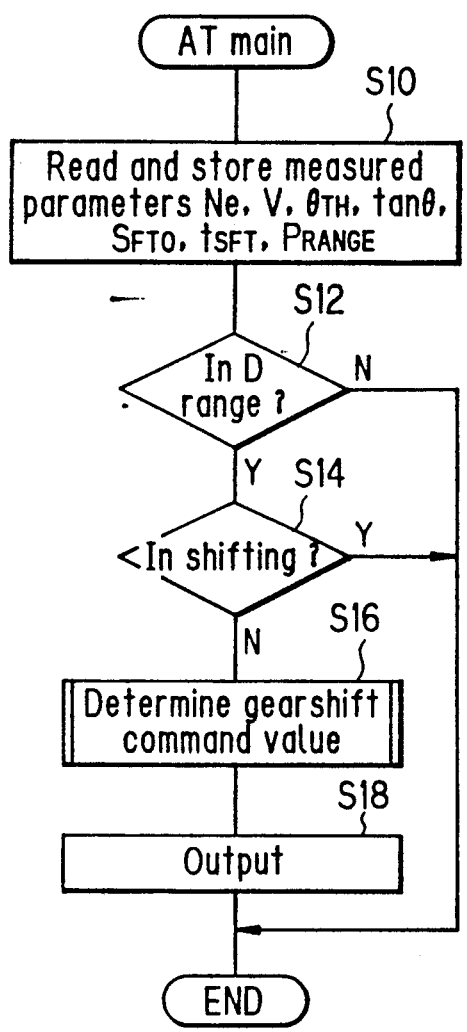
FIG. 3 is a main routine flowchart showing the operation of the control unit.

The operation of the control system will now be explained with respect to the flowcharts of FIG. 3 and later figures.

Before going into a detailed description, however, the general features of the control system will first be explained. What characterizes the control system according to the present invention is that it is constituted to apply fuzzy control logic so as to determine gearshift timing in a manner that resembles determination through human volition. Thus this invention is not characterized by the structure of the control system itself but by the operation of the control system, that is, by its method of control. Since fuzzy logic control has bee applied in various fields in recent years, the principles of this kind of control will be discussed only briefly in this specification.

In fuzzy control, the state of the subject to be controlled is ascertained in approximate terms and control values are determined on the basis of the approximate ascertainment using rules (called "fuzzy production rules") expressed linguistically in the form "If such and such then do such and such." In the production rules, the condition judgment standards and the content of operations are treated as approximated amounts (indicated as fuzzy labels or variables) and are quantified by using membership functions. Hence, the system creates a model of control operations exhibiting high flexibility and adaptability. Thus, since the expression of human knowledge is facilitated, fuzzy logic is well adapted for use with the so-called expert systems which enable the knowledge and judgments of an expert to be incorporated into a computer system. The present control system is based on these principles.

Therefore, in the present control system, tasks such as that of compiling the production rules required for application of fuzzy logic have to be carried out at the time of designing the control system for the automatic transmission, and during actual driving the control values are determined on the basis of this control algorithm. More concretely, the process is as follows.

(1) Compiling of Production Rules

As will be explained later, an appropriate number of linguistically expressed rules such as "If cruising at reasonable engine speed is desired, do not shift" are created. These rules are compiled by analyzing the judgments and operations of an expert driver of a vehicle with a manually shifted transmission and then selecting from among the rules of experience that can be induced from these judgments and operations.

(2) Setting Parameters and Membership Functions

Figure 9E:
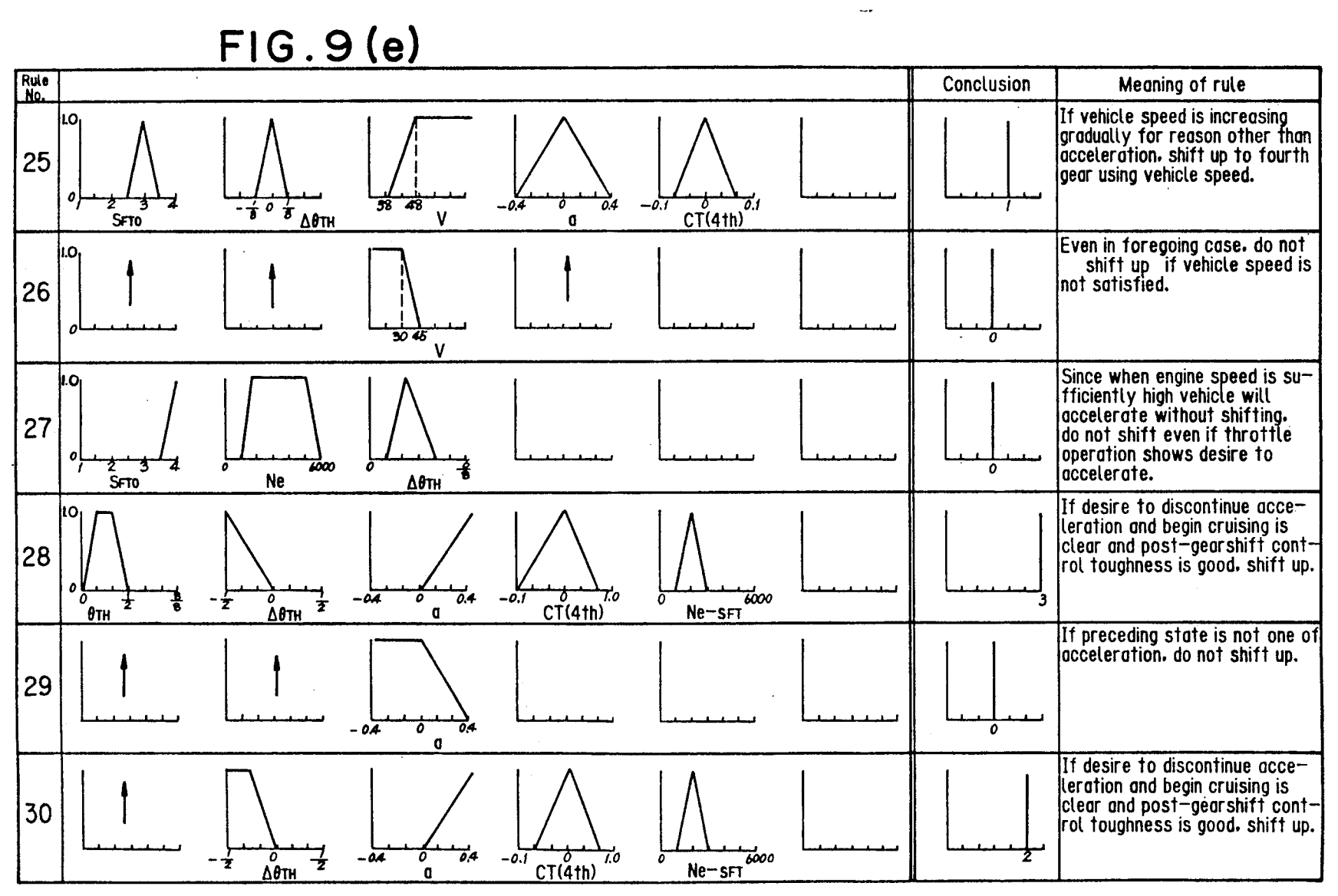
Figure 9G:
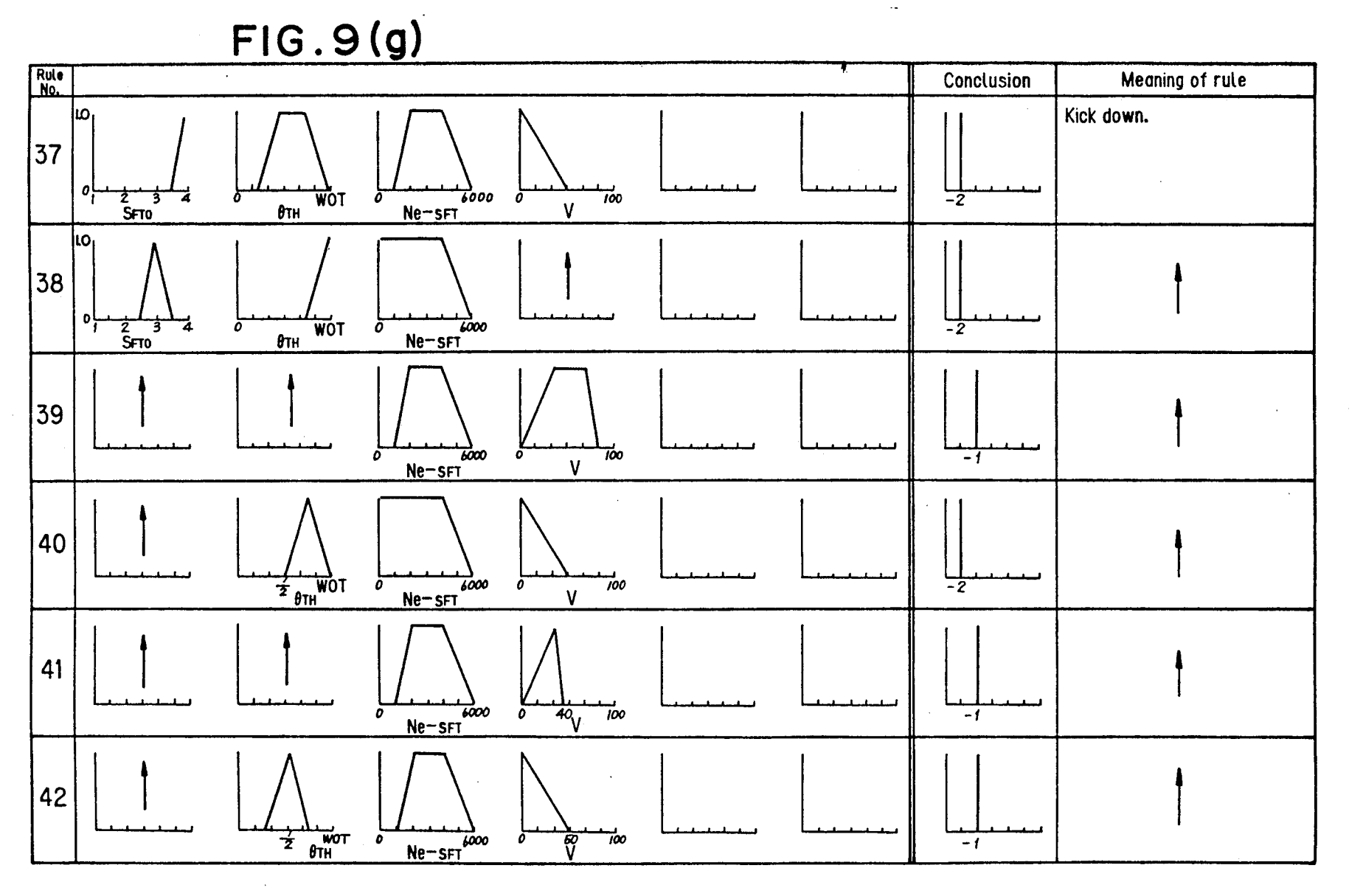

At the same time, the parameters to be used for ascertaining the state of the subject control are decided, the parameters (variables) to be used with the respective production rules are selected, and evaluation standards are set by fixing parameter membership functions (the state expressed by a membership function being referred to as a "fuzzy label"). In the present system, as the parameters there are used both measured values of physical properties detected by the sensors and computed values obtained as, for example, by differentiating the measured values. Specifically, as the parameters there are used, for example, the engine speed, the degree of throttle opening, the vehicle speed, the throttle opening change, the acceleration and the like. As shown in FIG. 9, a parameter is given an appropriate waveform (the aforesaid membership function) on the horizontal axis of a coordinate system (the horizontal axis being hereinafter referred to as the "universe of discourse") and the vertical axis is assigned values between 0 and 1.0 referred to as "membership values (grades)".

These are the preparatory tasks that have to be carried out at the time of designing the vehicle. In the preparatory stage, it is also necessary to select the sensors for detecting the selected parameters and to store in the memory of the control unit microcomputer the rules, the processing procedure commands and the like.

(3) Control During Running of the Vehicle

During running of the vehicle, the CPU 70c of the microcomputer receives (or computes) the parameters, refers to the rules, selects one of the rules through fuzzy reasoning, and after deciding what the result of the control is to be (e.g. shiftup by one gear), energizes/deenergizes the prescribed one(s) of the solenoids 36 and 38 so as to engage the next higher gear. In this fuzzy reasoning, membership values are computed for the parameters related to each rule and the smallest computed value is defined as the evaluation index for the rule concerned. Then the rule with the largest evaluation index is selected. This type of mini-max processing is widely used in fuzzy reasoning.

The operation of the present control system will now be explained with reference to FIG. 3 and later figures. The main routine flowchart shown in FIG. 3 generally indicates the operations of the present control system. The program of this flowchart is restarted at appropriate intervals of, for example, 10 to 40 milliseconds.

To begin with, the measured values being output by the aforesaid sensors at the start of the program are read and stored in memory in step S10. The measured values read at this time are the engine speed Ne (rpm) computed from the number of signals output by the crankshaft angle sensor 52 over a prescribed period of time, the vehicle speed V (km/h), the throttle opening $\theta$TH (degrees), the grade of the road surface tan $\theta$, the current gear position signal SFTO computed from the ratio between the rotation speeds of the transmission input and output shafts or from the engine speed, throttle opening, vehicle speed and the like, the time from the last shift operation tSFT(sec.) (not the output of a sensor but the time measured by the microcomputer time counter; an appropriate flag register is turned on when a shift command is issued by the microcomputer and the time lapse from this turn-on operation is measured), and the range position signal PRANGE.

The procedure then advances to step S12 where it is determined whether the range selector is in D range and if it is, the procedure advances to step S14 in which it is judged whether or not a shifting operation is in progress. This judgment is made by referring to the aforesaid gearshift command flag. When it is determined in step S14 that a shifting operation is not in progress, the procedure moves to step S16 in which the gearshift command value is determined. This operation will be explained later. When the determination is NO in step S12 or YES in step S14, the program procedure is immediately discontinued.

Figure 4:
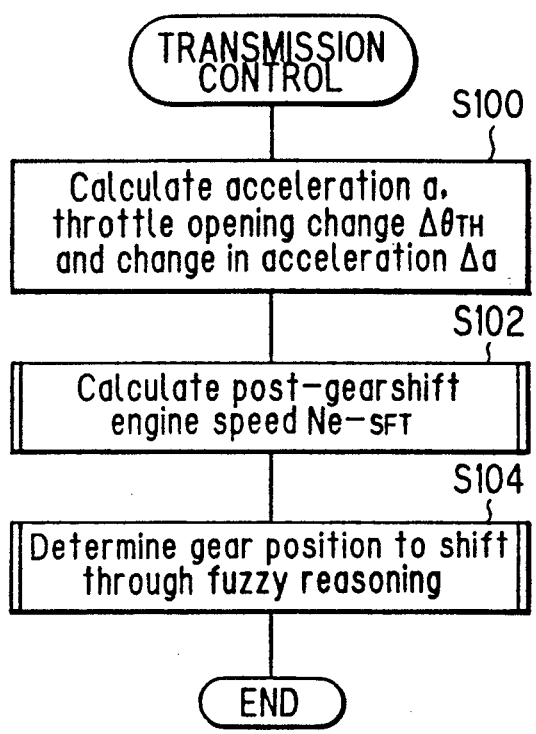
FIG. 4 is a flowchart showing a subroutine of the main routine, for determining a gearshift command value.
Figure 5:
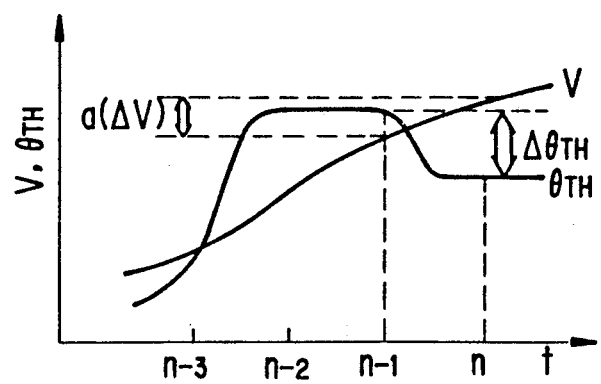
FIG. 5 is a graph for explaining an operation carried out in the subroutine of FIG. 4, for computing parameters.

FIG. 4 is a flowchart showing a subroutine for determining the gearshift command value. In step S100 of the subroutine, the vehicle speed V (km/h) and the throttle opening $\theta$TH (degrees) detected at the start of the preceding program cycle are read out and used to compute the acceleration a (km/h/sec.) (speed deviation), the throttle opening change Delta $\theta$TH (degree/sec.) and the change in acceleration Delta a (km/h/sec./sec.). More specifically, as shown in FIG. 5, the acceleration and the throttle opening change are computed by obtaining the deviation between the value at the start of the current program cycle (time n) and the value at the start of the preceding cycle (time n−1) (namely, the first differential derivative over the time n−(n−1)). The change in acceleration is obtained by further differentiating the acceleration over time. In actual operation, the acceleration is computed as km/h/0.1 sec, the throttle opening changes as degree/0.1 sec. and the change in acceleration as km/h/0.1 sec./0.1 sec.

In the succeeding step S102 the post-gearshift engine speed Ne-SFT is calculated. Specifically, calculations are carried out to estimate how the engine speed would change should the transmission be shifted from the present gear position to each of the other gear positions. Since the transmission of the embodiment under discussion has four speeds forward, this means estimating what the engine speed would become if the transmission were shifted from its present gear position to each of the remaining three gear positions. This calculation is carried out in accordance with the subroutine flowchart of FIG. 6.

Figure 6:
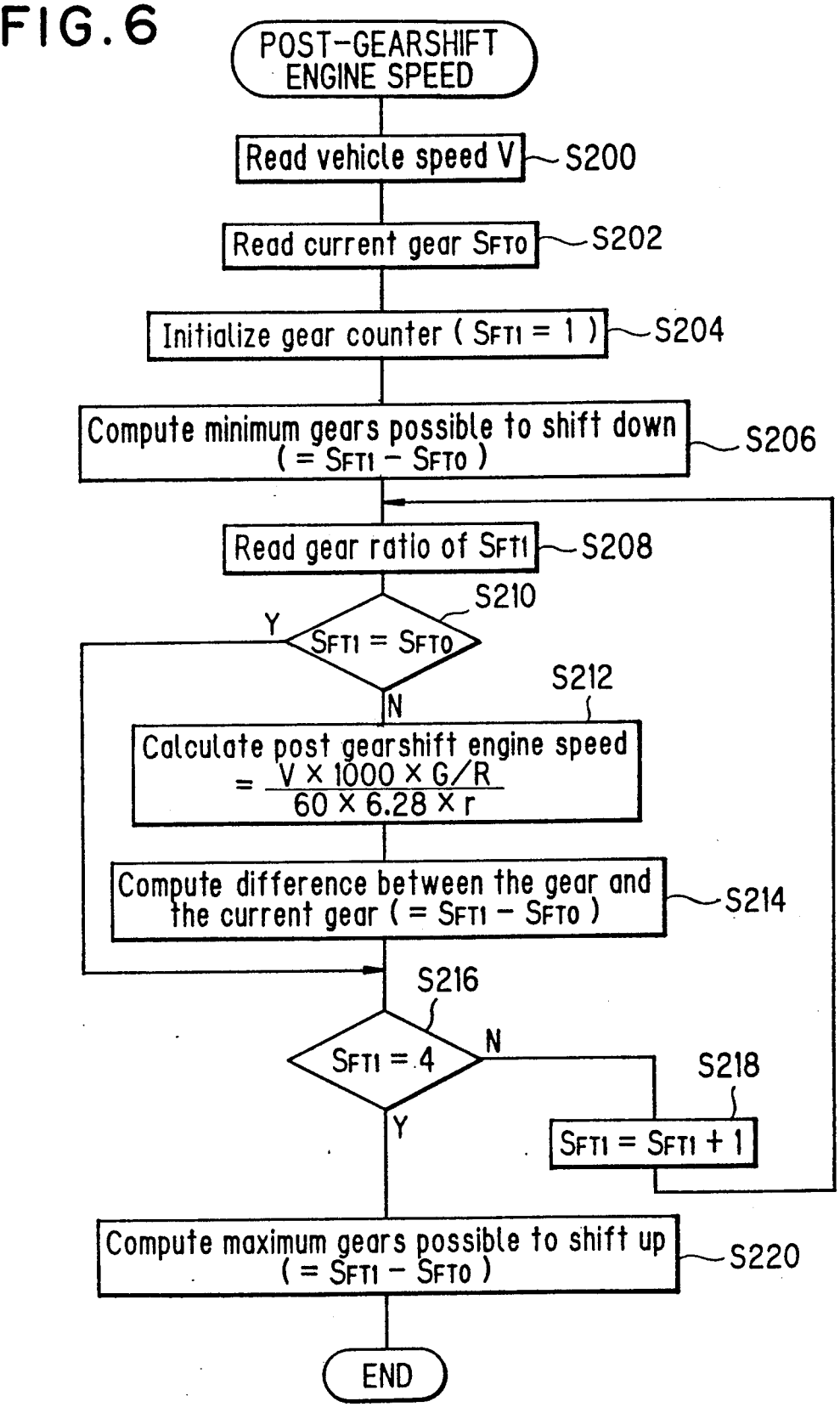
FIG. 6 is a flowchart showing a subroutine of the flowchart of FIG. 4, for computing a post-gearshift engine speed.
Figures 7, 10:
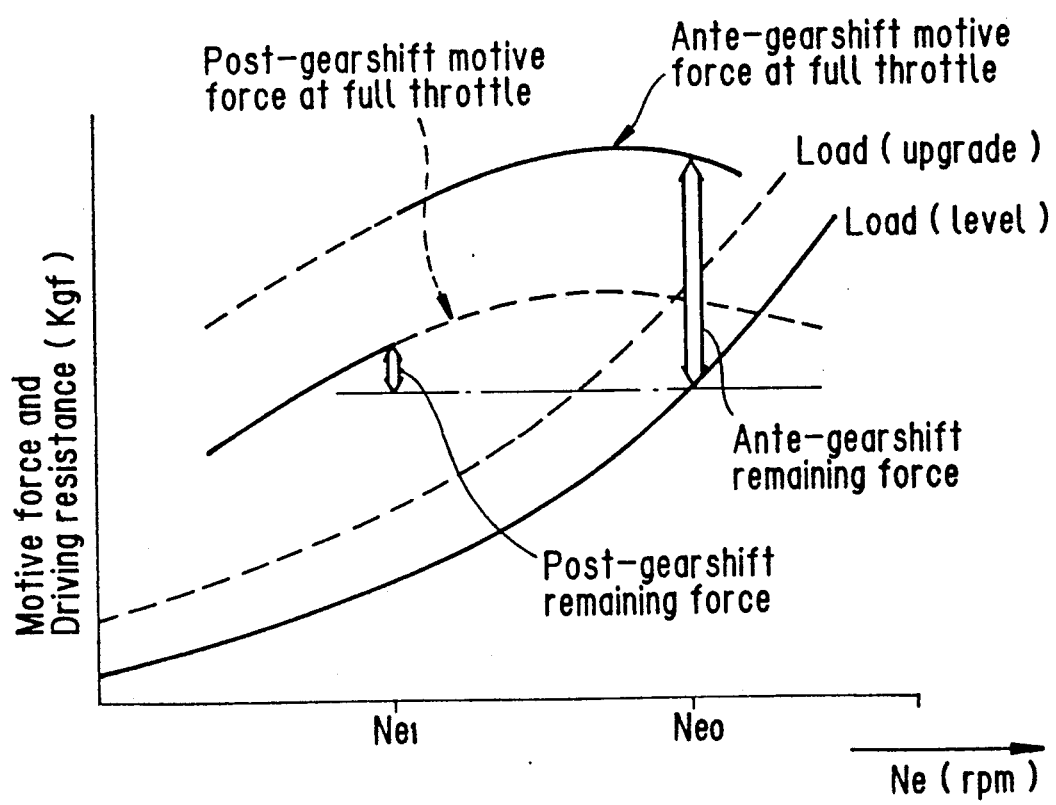
FIG. 7 is an explanatory chart showing an example of the computation in the flowchart of FIG. 6.
FIG. 10 is a graph showing vehicle dynamics for showing the basis for control toughness used in the rules of FIG. 9.

After the vehicle speed V is read in the first step S200 of the subroutine of FIG. 6, the procedure advances to step S202 in which the current gear position SFTO is read and then to step S204 in which a counter for counting the post-gearshift gear positions is initialize to SFT1=1 (meaning that the gear to be shifted into is set first to 1st gear position). Next in step S206, the difference (number of gear steps) between the first gear position and the current gear position is obtained and the minimum number of gear positions it is possible to shift down is computed. As shown in FIG. 7, this means that if the current gear position is 3rd, it is possible to shift down by two gear positions. The procedure then moves to step S208 in which the gear ratio G/R of the first gear is read from among data stored in advance in the ROM 70d of the microcomputer. Then after it has been confirmed in step S210 that the current gear position is not first gear, the procedure moves to step S212 in which the post-gearshift engine speed Ne-SFT is calculated as $$Ne\text{-}SFT = (V \times 1000 \times (G/R))/(60 \times 6.28 \times r)[\text{rpm}]$$

where V is the vehicle speed; 1000, 60 and 6.28 are constants for calculating the vehicle speed from the gear ratio; G/R is the gear ratio (of the current gear); and r is the effective tire radius (m)

In the following step S214, the number of gearshift steps is calculated from the difference between the gear concerned (first gear) and the current gear, and a similar calculation is carried out for each gear position up to the fourth (step S216 and step S218). After the top gear position has been reached, the maximum number of gear positions it is possible to shift up is calculated in step S220 and the procedure of the subroutine is concluded. An example of the aforesaid calculation is shown in FIG. 7.

Figure 8:
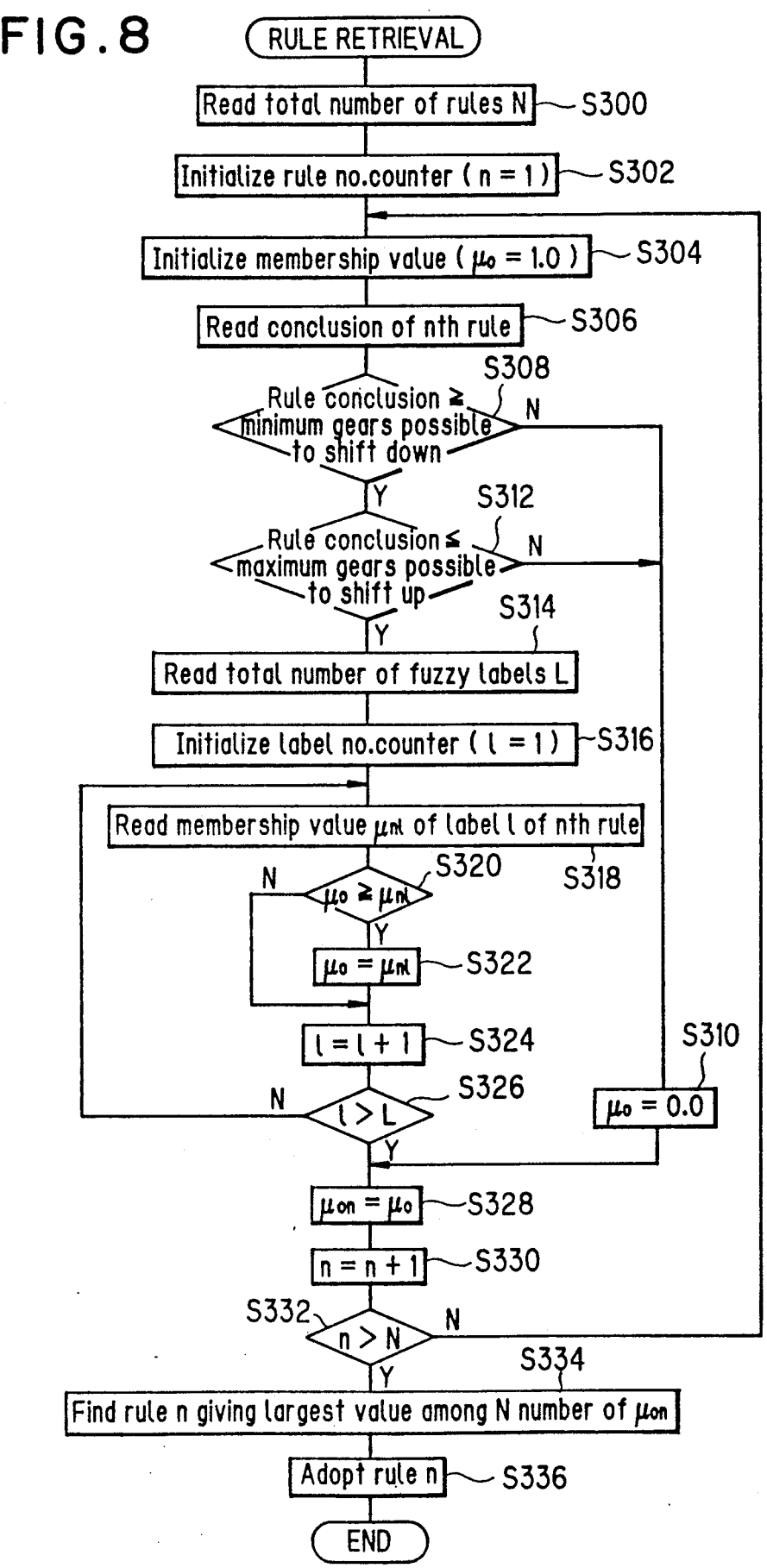
FIG. 8 is a flowchart showing a subroutine of the flowchart of FIG. 4, for retrieval of fuzzy production rules.

Returning to FIG. 4, the procedure then moves to step S104 in which the appropriate fuzzy production rule is retrieved. The subroutine flowchart for this purpose is shown in FIG. 8. Before going into an explanation of this flowchart, however, a brief explanation will first be made with reference to FIGS. 9(a) to 9(h) of the rules used in this embodiment. As was explained earlier, these rules, the parameters and the membership functions used therewith, and the like are determined in advance at the time of designing the control system of the vehicle.

The present embodiment uses 44 production rules, the details of which are illustrated in FIGS. 9(a) to 9(h). The individual rules will now be explained.

Rule 1

Fuzzy labels used
    Throttle opening change Delta $\theta$TH (degree/0.1 sec.
    Specifically, WOT/8/0.1 sec, hereinafter the same
    Where WOt=84 degrees)
    Acceleration a (km/h/0.1 sec, hereinafter the same.)
    Engine speed Ne (rpm, hereinafter the same))
Conclusion
    Do not shift
Meaning of the rule
    "If cruising at reasonable engine speed is desired, do not shift."

More specifically, if it is desired to cruise with the engine operating at a reasonable engine speed, it can be presumed that the degree of throttle opening will probably not change, the rate of acceleration should be constant, and an engine speed of not more than 2,000 rpm is suitable for cruising (an engine speed of 2,000–4,000 rpm is, to a lesser or greater degree, considered suitable for cruising and one of more than 4,000 rpm is considered unsuitable for cruising). The degree to which this aim is satisfied is evaluated from the actual operating condition and when the degree of satisfaction is found to be higher than that of all other rules, this rule is selected.

The method of rule evaluation will be explained later with reference to FIG. 8 and only a brief explanation will be given here with reference to Rule 1. The position of the detected (or calculated) parameter value on the universe of discourse is found and a vertical line is drawn up from this position. The membership value (more specifically referred to as the "grade") of the point on the vertical axis corresponding to the point of intersection between this vertical line and the waveform is read. As a concrete example, presume that the actual values are Delta $\theta$TH=0 (degree/0.1 sec), a=0 (km/h/0.1 sec) and Ne=3000 rpm. When these values are applied to the fuzzy labels in FIG. 9(a), the grade of Delta $\theta$TH is 1.0, the grade of a is 1.0 and the grade of Ne is 0.5. In this case, since all of the fuzzy labels are satisfied at least within the range of the grade with the lowest value, the grade with the lowest value is taken to indicate the value of all of the fuzzy labels concerned. The result is thus that Rule 1 is evaluated to have a value of 0.5. The same type of evaluation is then conducted with respect to all of the rules and the rule with the highest evaluation value is selected as being the one having the highest degree of satisfaction. The gearshift position is determined in accordance with the conclusion of the selected rule. Therefore, if the selected rule should be Rule 1, no gearshift operation would be carried out.

The remaining rules will now be explained.

Rule 2

Fuzzy label
    Engine speed Ne only
Conclusion
    Shift up one gear
Meaning of the rule
    "If engine speed is high, shift up one gear to protect engine."

This is the rule for protecting the engine. When the engine speed exceeds 6,000 rpm and enters the red zone, the transmission is shifted to the next higher gear to protect the engine. The expression "Shift up one gear" is used here to mean to shift up one transmission speed. For example, if the transmission is presently in second gear it would be shifted to third gear. The same applies in the other rules as well.

Rule 3

Fuzzy labels
    Post-gearshift time lapsed tSFT (sec)
    Throttle opening change Delta $\theta$TH
Conclusion
    Do not shift
Meaning of the rule.
    "Do not shift shortly after shift operation."

It is assumed that if the throttle opening does not increase greatly soon after a shifting operation, the driver does not wish to change gears. Therefore, a prescribed period following gearshift of, for example, 1.6 to 2.5 seconds is established as a dead zone.

Rule 4 (Rules 5, 6)

Fuzzy labels
    Current gear position SFTO
    Vehicle speed V (km/h, hereinafter the same)
    Throttle opening $\theta$TH (degrees, hereinafter the same. WOT=84 degrees)

Conclusion
  Shift down three gears (two gears, one gear)
Meaning of the rules.
  "If throttle valve completely closed and vehicle speed very low, shift to first gear."

Rules 4 through 6 specify that the transmission is to be shifted to first gear when the throttle is fully closed and the vehicle speed is very low. Rule 4 applies when the current gear position is fourth gear, Rule 5 when it is third gear and Rule 6 when it is second gear. These rules are for the initial shifting operation.

Rule 7 (Rule 8)

Fuzzy labels
  Current gear position SFTO
  Vehicle seed V
  Throttle opening $\theta$TH
Conclusion
  Shift down two gears (one gear)
Meaning of the rules
  "If throttle valve completely closed and vehicle speed low, shift to second gear."

Rules 7 and 8 are similar to Rules 4–6 and specify that even though the vehicle speed has not dropped a very low level, the transmission is to be shifted to second gear if the vehicle still remains low speed.

Rule 9

Fuzzy labels
  Throttle opening $\theta$TH
  Throttle opening change Delta $\theta$TH
Conclusion
  Do not shift
Meaning of the rule
  "If throttle has returned rapidly in closing direction, presume no desire to change gears and do not shift."

This rule is for preventing the control from becoming soft and is mainly related to control technique.

Rule 10

Fuzzy labels
  Current gear position SFTO
  Change in acceleration Delta a (km/h/0.1 sec/0.1 sec, hereinafter the same)
  Control toughness CT (Second gear)
  Post-gearshift engine speed Ne-SFT (rpm, hereinafter the same) (Second gear)
  Acceleration a
  Throttle opening change Delta $\theta$TH
Conclusion
  Shift up from first gear to second gear
Meaning of the rule.
  "Shiftup from first gear to second gear during acceleration is to be carried out if acceleration has saturated and post-gearshift control toughness is good."

When the rate of acceleration has increased to near the point of saturation and the throttle valve has not returned (the accelerator is being depressed), the transmission is shifted to second gear. Moreover, in this case the control toughness in the second gear into which the transmission is to be shifted up is retrieved and, further, an evaluation is made with reference to the calculated value of the post-gearshift engine speed in second gear.

It will be noted that the concept of "control toughness" is also used as a parameter in this rule and that the decision regarding the shiftup operation is made after the effect on control toughness has been predicted. The term "control toughness" was coined by the inventors and means a "coefficient indicating appropriateness of vehicle response to change in throttle opening". The idea of control toughness was conceived in part for the purpose of eliminating the earlier mentioned busy feeling that the driver experiences because of the frequent shifting operations which occur when the vehicle is climbing a hill, pulling a camper or the like. This problem arises because an insufficiency in reserve force occurs after the driving resistance attributable to the external load on the vehicle is subtracted from the motive force, and the decrease in the remaining force is most pronounced at the time of shiftup when the motive force itself decreases.

This will be explained with reference to FIG. 10. This graphically shows the remaining force as an amount corresponding to the difference between the current driving resistance and the motive force at full throttle opening, assuming the current engine speed of the running vehicle to be at a speed of NeO. During hill climbing, since the driving resistance also includes the resistance component due to the grade of the hill being climbed, it is higher than at the time of level-ground running. Thus in the conventional system in which the gearshift point is determined solely on the basis of the vehicle speed and the throttle opening, return of the throttle opening to that for cruising while the vehicle is running up hill would result in a shiftup operation, which would cause a reduction in engine speed to a lower speed Ne1 and an accompanying drop in motive force at full throttle opening. As a result, a decrease corresponding to the remaining force would occur, with the result that the transmission would be shifted back down. Thus, repeated shiftups and shiftdowns occur giving the driver the busy feeling mentioned earlier.

Figure 11:
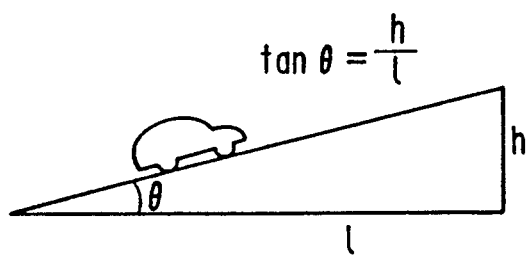
FIG. 11 is a diagram for explaining how climbing resistance is used as a parameter for determining control toughness.
Figure 12A:
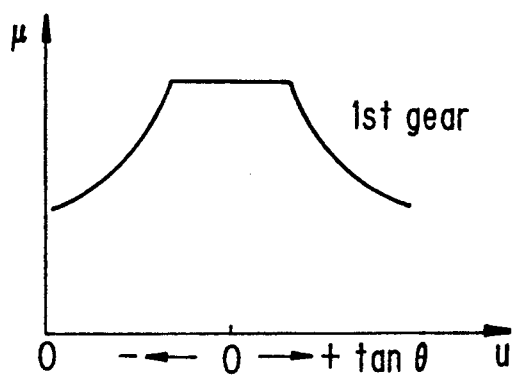
FIGS. 12(a) to 12(d) are graphs for explaining membership functions assigned to control toughness for each gear position
Figure 12B:
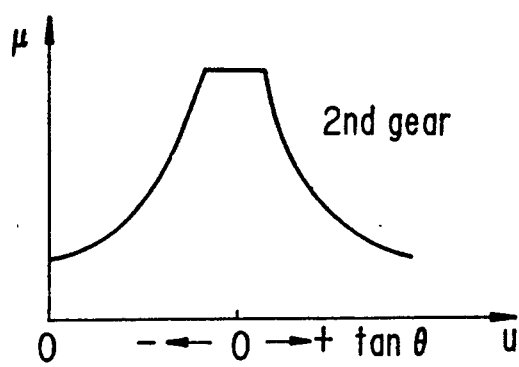
Figure 12C:
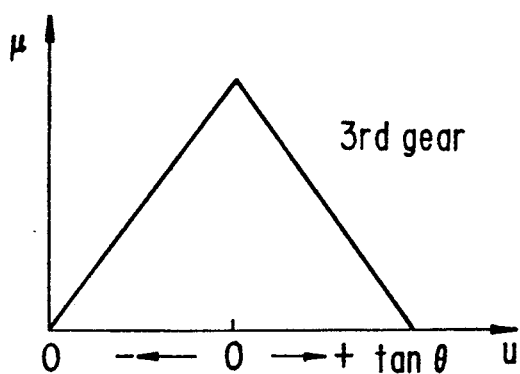
Figure 12D:
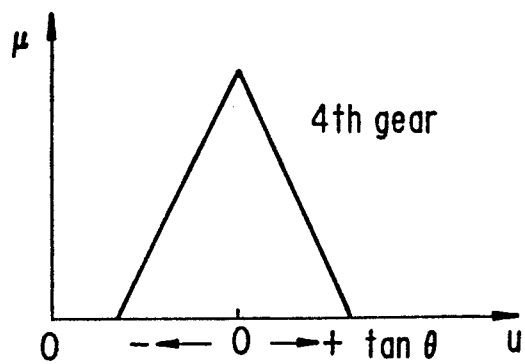

In other words, in such a case the vehicle would be unable to respond appropriately to the desire of the driver because the driving resistance is larger in comparison with the amount corresponding to remaining force. If it should be possible to take these circumstances into consideration at the instant of judging whether or not to shift up, it would thus be possible to avoid conducting meaningless shiftup operations. In the system according to this invention, therefore, the appropriateness of the vehicle response is viewed in terms of the reserve force and expressed as the control toughness, and judgment regarding shiftup is made with consideration being given to the control toughness. While the control toughness can be ascertained on the basis of any parameter insofar as the chosen parameter enables determination of the amount corresponding to the remaining force, the parameter used in the present invention is the driving resistance, particularly the climbing resistance component of the driving resistance. As shown in FIG. 11, the grade of the road surface is normally expressed as tan $\theta$ [height(h)/length(l)]. Based on this grade tan $\theta$, a membership function Mu is defined for each transmission speed, as shown in FIGS. 12(a) to 12(d). In each of these figures, the grade (positive values indicating an ascending slope, negative values a descending slope) is represented on the universe of discourse (the horizontal axis) and the membership values are represented on the vertical axis. When the grade is zero (level ground), the membership value is defined as maximum since the decrease in reserve force is small. Moreover, since the motive force is large in first gear, the range of grades over which the membership value remains at maximum is broad and in the regions in which the membership value declines, the rate of decline is low with respect to increasing grade. Thus the general shape of the membership coefficient waveform resembles a mesa. In the remaining gear positions, the shape of the membership coefficient waveforms becomes increasingly triangular and pointed, with that for the highest gear position being defined as a triangle with an acute apex. The fuzzy labels for the control toughness are stored in the ROM 70$d$ separately for each gear position, and in actual processing the calculation is carried out with respect to the target gear position. For example, in the case of Rule 10, since the rule assumes a shiftup operation from first gear to second gear, the calculation is carried out for second gear.

Rule 11

Fuzzy labels
  Current gear position SFTO
  Change in acceleration Delta a
  Acceleration a
  Throttle opening change Delta $\theta$TH
Conclusion
  Do not shift
Meaning of the rule
  "If it is unlikely that vehicle is accelerating, do not implement Rule 10."

This rule is established to supplement Rule 10, namely to prohibit selection of Rule 10 in a case where it is unlikely that the vehicle is accelerating. In fuzzy logic, the production rule having the highest evaluation value is automatically selected. Thus even when the vehicle is not accelerating and the evaluation value of Rule 10 is not so high, there is still a possibility of this rule being selected if its evaluation value should nevertheless happen to be greater than that of the other rules. If this should happen, an inappropriate control value would be determined. To avoid such a possibility, this Rule 11 is provided as what in the field of fuzzy sets is known as a "complementary set," namely as a complementary set with respect to one of the fuzzy labels of Rule 10 (specifically with respect to the membership function of the acceleration a). Namely, in contrast to the case of Rule 10 in which a higher grade is assigned when the acceleration a increasing, in the present rule a higher grade is assigned in the case where the acceleration a is decreasing. As a result, when the operating condition resembles that of Rule 10 but differs greatly therefrom in the point that the vehicle is not accelerating, the grade of the acceleration a in Rule 11 becomes high, making it possible to prevent the selection of Rule 10. Since Rule 11 does not suppose a shift operation, no reference is made to the post-gearshift engine speed or the control toughness.

Rule 12

Fuzzy labels
  Current gear position SFTO
  Change in acceleration Delta a
  Acceleration a
  Throttle opening change Delta $\theta$TH
Conclusion
  Do not shift
Meaning of the rule.
  "If acceleration has not saturated, do not shift."

This rule is paired with Rule 10. As it is still possible to accelerate after it has been judged form the change in acceleration Delta a that the acceleration a has saturated, this rule states that shifting is not to be carried out in such a case. Thus the change in acceleration Delta in this rule constitutes a complementary set with respect to that in Rule 10, so that selection of Rule 10 is prevented under operating conditions that satisfy this rule.

Rule 13

Fuzzy labels
  Current gear position SFTO
  Vehicle speed V
Conclusion
  Do not shift
Meaning of the rule.
  "Since it is unnecessary to shift up to second gear at very low speed, do not shift."

Rule 13 is similar to Rules 4-8.

Rule 14

Fuzzy labels
  Current gear position SFTO
  Throttle opening change Delta $\theta$TH
  Vehicle speed V
  Acceleration a
  Control toughness CT (second gear)
Conclusion
  Shift up one gear
Meaning of the rule.
  "When acceleration force is weak, shift up using vehicle speed."

This is the rule for moderate acceleration. It prescribes that when the driver has no strong intention to accelerate as judged from the fact that the throttle has not been operated and the vehicle speed is stable, namely in the case of moderate acceleration, the transmission is to be shifted up one gear in the interest of fuel economy. During rapid acceleration, since the acceleration saturates, this fact can be used as an index for shiftup, as was explained earlier. However, when the acceleration is moderate, no saturation is observed. Therefore, the vehicle speed is used as the index for the shiftup decision. Since this rule supposes that the transmission is to be shifted up to second gear, the control toughness in second gear is referred to.

Rule 15

Fuzzy labels
  Current gear position SFTO
  Change in acceleration Delta a
  Control toughness CT (third gear)
  Post-gearshift engine speed Ne-SFT (third gear)
  Acceleration a
  Throttle opening change Delta $\theta$TH
Conclusion
  Shift up one gear (from second gear to third gear)
Meaning of the rule.
  "Shiftup from second gear to third gear during acceleration is to be carried out if acceleration has saturated and post-gearshift control toughness is good."

This is similar to Rule 10 except for prescribing shiftup from second gear to third gear instead of from first gear to second gear. A detailed explanation of this rule is therefore omitted. Rules 16 and 17 are complementary rules to Rule 15 in the same way that Rules 11 and 12 are complementary rules to Rule 10.

Rule 18

Fuzzy labels
  Current gear position SFTO
  Engine speed Ne
  Throttle opening change Delta $\theta$TH
Conclusion
  Do not shift
Meaning of the rule.
  "Since when engine speed is sufficiently high vehicle will accelerate without shifting, do not shift even if throttle operation shows desire to accelerate.

When the driver floorboards the accelerator pedal in an attempt to accelerate, the present system will sense the driver's intention. Moreover, it judges from the engine speed whether to accelerate by shifting down to increase the motive force or to accelerate without shifting down. This choice is made because when the engine speed is high so is the motive force, so that it is possible to accelerate without shifting gears.

Rule 19

Fuzzy labels
  Current gear position SFTO
  Throttle opening change Delta $\theta$TH
  Vehicle speed V
  Acceleration a
  Control toughness CT (third gear)
Conclusion
  Shift up one gear
Meaning of the rule.
  "When acceleration force is weak, shift up using vehicle speed."

This rule is similar to Rule 14 except that the current gear position is second gear and, as a result, the membership value becomes 1.0 at a higher velocity of 30 km/h.

Rule 20

Fuzzy labels
  Current gear position SFTO
  Throttle opening change Delta $\theta$TH
  Vehicle speed V
  Acceleration a
Conclusion
  Do not shift
Meaning of the rule.
  "Even in foregoing case, do not shift up if vehicle speed is not satisfied."

The reason for providing this rule complementary to Rule 19 but not providing a similar one complementary to Rule 14 is that Rule 14 presumes the transmission to be in first gear while this rule presumes it to be in second gear and since the motive force is lower in second gear, it is necessary for shiftup that the vehicle speed be sufficient. Therefore, the vehicle speed V is included in Rule 20 as a complementary set with respect to the vehicle speed V (only in the low speed region) in Rule 19.

Rules 21-26

These rules are similar to Rules 15-20 and differ therefrom only in that the presumed intention is to shift from third gear to fourth gear.

Rule 27

Fuzzy labels
  Current gear position SFTO

Engine speed Ne

Throttle opening change Delta $\theta$TH
Conclusion
  Do not shift
Meaning of the rule.
  "Since when engine speed is sufficiently high vehicle will accelerate without shifting, do not shift even if throttle operation shows desire to accelerate."

This rule is similar to Rule 24.

Rule 28

Fuzzy labels
  Throttle opening $\theta$TH
  Throttle opening change Delta $\theta$TH
  Acceleration a
  Control toughness CT (third gear)
  Post-gearshift engine speed Ne-SFT (forth gear)
Conclusion
  Shift up three gears
Meaning of the rule.
  "If desire to discontinue acceleration and begin cruising is clear and post-gearshift control toughness is good, shift up."

The premises of this rule are that it is know from the acceleration a that the vehicle is accelerating, that the throttle opening $\theta$TH has returned to that for cruising, and that the post-gearshift engine speed Ne-SFT (in fourth gear) will be in the vicinity of 2,000 rpm. Under these circumstances, if the control toughness in fourth gear will be good, the transmission is to be shifted up three gears to the top (fourth) gear. Thus this rule supposes that the present gear position is first gear.

Rule 29

Fuzzy labels
  Throttle opening $\theta$TH
  Throttle opening change Delta $\theta$TH
  Acceleration a
Conclusion
  Do not shift
Meaning of the rule.
  "If preceding state is not one of acceleration, do not shift up."

This is a complementary rule to Rule 28 which prescribes that even if the operating condition is similar to that of Rule 28, shiftup is to be avoided insofar as it is not found from the vehicle speed V that the vehicle is accelerating. Thus, the acceleration a in Rule 29 is a complementary set with respect to Rule 28.

Rules 30-33

The gist of these rules is the same as that of the earlier Rules 28 and 29 and differ therefrom only in the current gear position presumed.

Rule 34

Fuzzy labels
  Current gear position SFTO
  Throttle opening $\theta$TH
  Post-gearshift engine speed Ne-SFT (first gear)
  Vehicle speed V
Conclusion
  Shift down three gears
Meaning of the rule.
  "(If throttle is completely open and post-gearshift engine speed is not extremely high), kickdown."

This and the remaining rules (up to Rule 44) are kickdown rules. This rule supposes that the current gear position SFTO is fourth gear, that the throttle opening is great and that the post-gearshift engine speed Ne-SFT (in first gear) will not become extremely high. Under these circumstances, if the vehicle speed V is low, the transmission is to be kicked down three gear positions to first gear. Rules 35-37 similarly relate to kickdown from fourth gear but differ in the vehicle speed condition dealt with and, depending on differences in the throttle opening and the like, prescribe a kickdown by two or one gear positions.

Rules 38-44 are also similarly phrased, with Rules 38-42 and Rules 43 and 44 pertaining to kickdown when the transmission is currently in third gear and second gear, respectively.

Based on the foregoing explanation, the fuzzy production rule retrieval subroutine of FIG. 8 will now be explained. First, the total number of rules N is read in step S300. In the present embodiment there are a total of 44 rules (N=44).

The procedure then advances to step S302 in which a counter for counting the rule numbers is initialized to n=1, i.e. is set to Rule 1. Then in step 304 the membership value Mu computation column (not shown) in the RAM 70e of the microcomputer is initialized to membership value Mu0=1.0.

The procedure then advances to step S306 in which the conclusion of the nth rule is read, this conclusion specifying the number of gearshift steps. Thus in the first processing cycle by the program, the conclusion "0" (Do not shift) of Rule 1 is read.

Then in step S308 it is determined whether or not the number of gearshift steps read in step 306 is greater than the number calculated according to the flowchart of FIG. 6 as being the minimum number of gearshift steps it is possible to shift down. Since if the number of gearshift steps stipulated by the rule concerned is less (greater in the negative direction) than the minimum number possible it would be meaningless to select the rule, the procedure moves to step S310 in which the membership value Mu0 of the rule concerned is set to 0.0. On the other hand, if it is found not to be greater in step 308, the procedure goes to step 312 in which it is judged whether the conclusion of the rule concerned is within the range of the maximum number of possible shiftup steps and if it is not, the procedure goes to step S310 because selection of the rule would again be meaningless.

If the result in step 312 is YES, the procedure moves to step 314 where the total number of fuzzy labels L is read and then to step S316 where a counter for counting the number of fuzzy labels is set to the initial value of one. By way of example, the number of fuzzy labels is 3 in the case of Rule 1.

Then in the succeeding step S318, the membership value Mun1 of the first fuzzy label of the nth rule is read. As explained earlier, this operation involves finding the point on the universe of discourse corresponding to the actually detected value or the value computed therefrom, drawing a line vertically from this point and reading the membership value at the point of intersection between this vertical line and the waveform. In this first cycle of the program, Delta $\theta$TH=0 (degree/0.1 sec), a=0 (km/h/0.1 sec) and Ne=3000 (rpm) and the operation is thus that of reading the value Mu11=0.95 for Delta $\theta$TH. The procedure then advances to step S320 in which the values of Mun1 read in the respective steps are compared with the initial value Mu0 set in step 304. If Mun1 is found to be smaller than Mu0, Mu0 is rewritten to Mun1 is step S322 and the label number is incremented in the following step S324, whereafter the procedure returns to step S318 via step S326. The same procedure is then repeated until the membership values for all of the fuzzy labels have been read. When it has been confirmed in S326 that reading has been completed, the procedure moves on to step S328 where the smallest membership value Mu0 is selected as the membership value MuOn for the rule n. In step S320, if Mu0 is found to be smaller than Mun1, the procedure jumps directly to step S324, and in steps S308 and S312, if the result of the judgment is NO, the membership value 0.0 is selected as the smallest value for the rule in step S310, as aforementioned. Thus in the steps S300-328, the smallest membership value of the rule is selected.

The procedure then advances to step S330 where the rule number n is incremented and then to S332 in which the same procedures are repeated until it has been found that the final rule has been reached, whereafter the procedure goes to step S334 in which the rule giving the largest membership value is selected and then to step S336 in which the selected rule is adopted.

Returning to FIG. 3, output processing is then conducted in Step S18 in accordance with the conclusion of the selected rule. More specifically, the solenoids 36, 38 are energized/deenergized via the output circuits 74, 76 so as to engage or hold the target gear position.

As explained in the foregoing, in the present embodiment the appropriateness of the vehicle response to the desire of the driver is quantitatively measured from the slope of the road and used as one of the parameters in addition to such parameters as the throttle opening and the vehicle speed, a plurality of rules inferred from an analysis of the judgments and operations of an expert driver of a vehicle equipped with a manually shifted transmission are established, and fuzzy reasoning is applied for evaluating the rules and selecting the optimum value. As a consequence of this arrangement, the vehicle operating conditions, including those relating to the surrounding circumstances, are grasped as a plurality of variables and instantaneously processed, whereby an automatic transmission can be controlled in a manner resembling that in accordance with the judgments and operations of an expert driver driving a vehicle with a manually shifted transmission. Thus by use of fuzzy techniques it is possible to achieve appropriate control similar to the manual gearshift operations of a human being and to eliminate the shortcomings of the prior art technology such as that of the system being restricted to the set data and the gearshift timing being determined solely on the basis of the throttle opening and the vehicle speed. Further, by increasing the number of rules beyond those disclosed in the foregoing, it becomes possible to realize gearshift control in ways that enhance compliance with emission regulations and to respond more flexibly to gearshift control characteristics desired by customers. In this sense, the system according to this invention is totally different from conventional systems in purpose, makeup and effect.

FIGS. 13(a) to 13(h) show a second embodiment of the present invention. One feature characterizing the present embodiment is that only the parameter of Rule 2 is assigned a maximum membership value of 1.0 and all of the other 43 rules have a maximum membership value of 0.95. Because of this, the evaluation value of Rule 2 has relatively greater weight in the mini-max computation referred to earlier, meaning that the Rule 2 has the greatest probability of being selected. This reason for adopting this arrangement is that the set of rules listed in FIGS. 9(a) to 9(h) can be broadly divided into the following two groups.

a. Rule for protecting the engine (Rule 2)
b. Other rules (Rule 1 and Rules 3–44)

Therefore since Rule 2 is concerned with damage to the engine, it can be considered to be of greater importance than the other rules. More specifically, careful consideration of the set of rules shows that the rules can be ranked by degree of importance. Thus, it is preferable for rule with higher importance to be selected without fail in the anticipated operating condition. As a result of the adopted arrangement, the probability is high that Rule 2 will be selected and the transmission shifted one gear up in an operating condition in which the engine speed is high, irrespective of the degree of throttle opening and other conditions. The control can thus be carried out with greater reliability. In this sense, this provides an effect similar to that realized by the establishment of the supplemental rule, e.g. Rule 11 in the first embodiment. Although in the present embodiment top priority is given only to Rule 2 and only two types of maximum values (1.0 and 0.95) are established, it should be understood that the ranking can be in finer degrees.

FIGS. 14(a) to 14(c) show a third embodiment of the present invention. The difference between the third embodiment and the first and second embodiments is that the number of rules is greatly decreased. That is, the rules are established separately for each gear concerned in the earlier two embodiments, while in the third embodiment the rules are prepared in common for gears so as to lessen the number of the rules. Secondly, the adoption of an irrelevant rule is prevented in a different manner from those mentioned in the earlier embodiments. Here, neither establishing of the supplemental rules nor ranking of the membership values are used. Instead, the membership value of the selected rule is compared with a reference value and if it is found to be less than the reference value, adoption of the rule once selected is canceled, as will be explained later. At that instance, the rule previously adopted will be again used.

Thus, the number of rules used here is reduced to 18, as shown in the figures. Since the rules themselves are the similar to as those shown in FIGS. 9(a) to 9(h), explanation will only be made as to which rule does correspond to that in the first and second embodiments. That is;

| Third embodiment | First embodiment |
|---|---|
| Rule 1 | Rules 10–12, 15–17, 21–22 |
| Rule 2 | Rule 1 |
| Rules 3, 4, 5 | Rules 28, 30, 32 |
| Rule 6 | Rule 2 |
| Rule 7 | Rule 3 |
| Rules 8, 9, 10 | Rules 4, 5, 6 |
| Rules 11, 12 | Rules 7, 8 |
| Rules 13–18 | Rules 34–44 |

Now, with reference to FIG. 15, the third embodiment will be explained focusing on the aforesaid second characteristic features.

Figure 15:
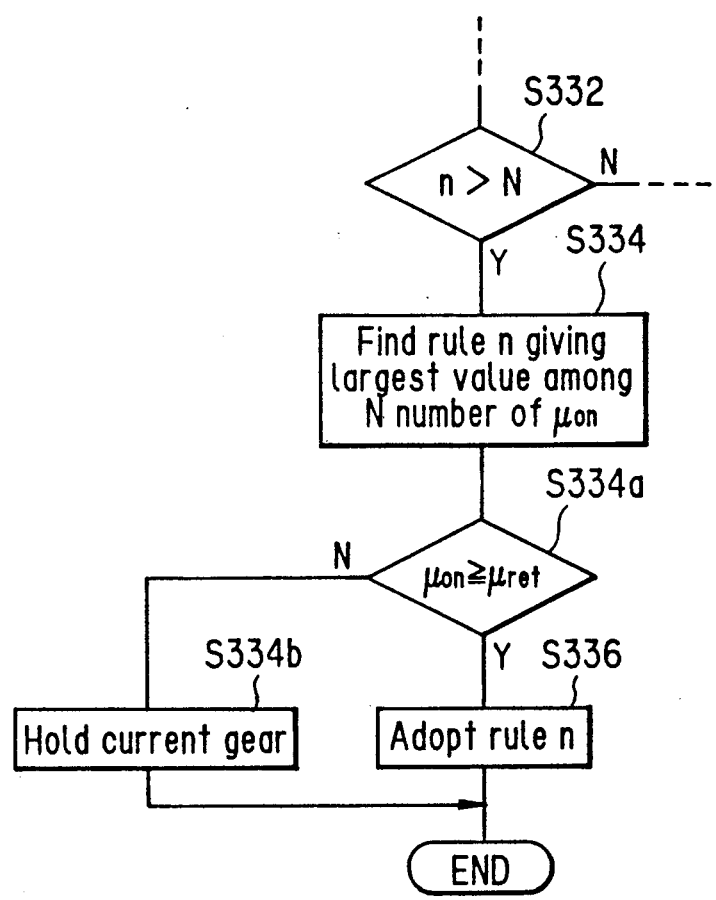
FIG. 15 is a flowchart, similar to FIG. 8, but showing a subroutine for retrieval of the fuzzy production rules according the third embodiment of the invention.

FIG. 15 shows a subroutine for selecting the rule in the third embodiment and is an alteration of FIG. 8 used in the first embodiment, where only the altered portions are illustrated. In the flowchart, after it has been confirmed in step S332 that whole rules have been examined and the rule giving the largest value has been selected in step S334, the membership values MuOn of the selected rule is then compared with the reference value Muref, for instance 0.5, at step S334a. If it is found that the membership value exceeds the reference value, the procedure advances to step S336 where the rule is adopted. On the other hand, if the membership value is found to be less than the reference value at step S334a, the procedure goes to step S334b and the selection of the rule is canceled and the command value will be determined by the rule adopted at the previous cycle so that the gear remains at the same position.

The advantages resulted from the third embodiment are that, a memory in smaller capacity can be used in the microcomputer and calculation period will be shortened, since the number of rules is thus decreased. And needless to say, it can effectively prevent such a rule from being adopted as is irrelevant in the anticipated vehicle operating condition.

Figure 16:
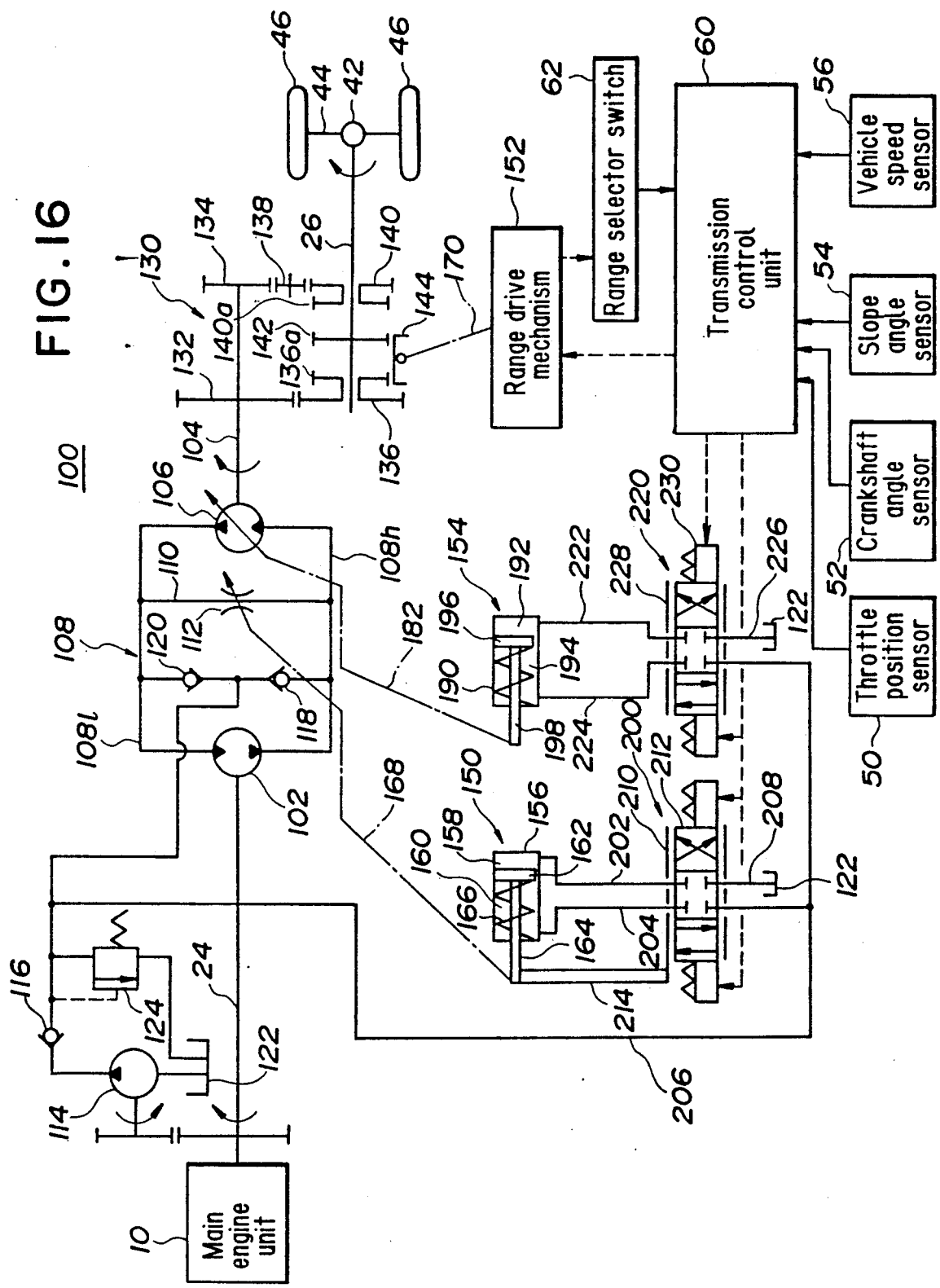
FIG. 16 is a schematic diagram of the overall arrangement of a control system for a continuously variable transmission in accordance with a fourth embodiment of the invention, primarily illustrating the hydraulic circuit of the system.

FIG. 16 shows a fourth embodiment according to the present invention in which the aforesaid transmission control employing fuzzy reasoning is applied to a continuously variable transmission (CVT).

The general overall view in FIG. 16 centers mainly on the hydraulic circuit of the continuously variable transmission, wherein like reference characters used in the first embodiment designate like or corresponding parts in the fourth. The continuously variable transmission generally denoted by reference numeral 100 has a hydraulic pump 102, fixed in discharge capacity, connected to and driven by the aforesaid transmission input shaft 24 and a hydraulic motor 106, variable in discharge capacity, connected coaxially to be driven by the hydraulic pump 102. The output force of the hydraulic motor 106 is taken out via a drive shaft 104. The hydraulic pump 102 and the hydraulic motor 106 constitute a closed hydraulic circuit 108. In the closed hydraulic circuit 108, the outlet of the hydraulic pump 102 and the inlet of the hydraulic motor 106 are interconnected by a high-pressure hydraulic line 108h while the outlet of the hydraulic motor 106 and the inlet of the hydraulic pump 102 are interconnected by a low-pressure hydraulic line 108l. The closed hydraulic circuit 108 is further provided with a short circuit line 110 interconnecting the outlet and inlet of the pump 102, i.e. interconnecting the high-pressure and low-pressure hydraulic lines 108h and 108l. The short circuit line 110 has a clutch valve 112 provided at an intermediate portion thereof. In addition to the hydraulic pump 102 there is further provided an auxiliary pump 114 which is also driven by the transmission input shaft 24 and has its outlet connected with the high-pressure hydraulic line 108h via a check valve 116 and a check valve 118 and with the low-pressure hydraulic line 108l via the check valve 116 and a check valve 120. The auxiliary pump 114 serves to supply additional fluid drawn from a tank 122 to the closed hydraulic circuit 108. Reference numeral 124 in the figure designates a relief valve.

The aforesaid output shaft 26 disposed in parallel with the aforesaid drive shaft 104 of the hydraulic motor 106, is connected with the rear wheels 46 and a forward/reverse switching device 130 is provided between the drive shaft 104 and the transmission output shaft 26. The forward/reverse switching device 130 has first and second drive gears 132, 134 fixed on the drive shaft 104 as spaced from each other in the axial direction of this shaft, a first driven gear 136 rotatably journaled on the transmission output shaft 26 and engaged with the first drive gear 132, a second driven gear 140 rotatably journaled on the transmission output shaft 26 and connected with the second drive gear 134 via an intermediate gear 138, a driven toothed gear wheel 142 fixed on the transmission output shaft 26 between the first and second driven gears 136, 140, and a clutch member 144 for selectively connecting the driven toothed wheel 142 with one of the driven gears 136, 140. The sides of the first and second driven gears 136, 140 facing the driven toothed wheel 142 are respectively provided with drive toothed wheels 136a and 140a, and the clutch member 144 is movable between a first position for engaging the drive toothed wheel 136a and the driven toothed wheel 142 and a position for engaging the drive toothed wheel 140a and the driven toothed wheel 142. In the so constituted forward-/reverse switching device 130, as shown in FIG. 16, the transmission output shaft 26 is rotated by the drive shaft 104 in the opposite direction from the drive shaft 104 when the drive toothed wheel 136a is engaged with the driven toothed wheel 142, whereby the rear wheels 46 are driven in the direction for forward travel of the vehicle. To the contrary, when the driven toothed wheel 142 and the drive toothed wheel 140a are engaged, the transmission output shaft 26 rotates in the same direction as the drive shaft 104, whereby the rear wheels 46 are driven in the direction for reverse travel.

In the system, the clutch valve 112 is driven by a servo cylinder 150, the forward/reverse switching device 130 is controlled by a range drive mechanism 152 comprising hydraulic cylinders and the like, and control of the discharge capacity of the hydraulic motor 106 is conducted by a hydraulic cylinder 154, which will now be explained individually. The servo cylinder 150 comprises a cylinder 156, a piston 162 which divides the inner space of the cylinder 156 into a head chamber 158 and a rod chamber 160, a piston rod 164 formed integrally with the piston 162, and a spring 166 disposed within the rod chamber 160 for urging the piston 162 in the direction of the head chamber 158. The distal end of the piston rod 164 is connected with the clutch valve 112 via a link 168 in such manner that the clutch valve 112 is fully opened when the spring 166 pushes the piston 162 as far right as possible in FIG. 16. This causes the fluid discharged by the hydraulic pump 102 to pass through the short circuit line 110 so that the hydraulic motor 106 is not driven and, consequently, no power is transmitted to the rear wheels 46 via the shafts 26 and 104. On the other hand, as the piston 162 moves to the left against the force of the spring 166, the opening of the clutch valve 112 becomes progressively smaller, whereby the continuously variable transmission 100 progressively passes from a partially clutched state to a fully engaged state in which the power is completely transmitted to the rear wheels 46 at the time the piston 162 moves to its left limit and the clutch valve 112 is fully closed.

Figure 17:
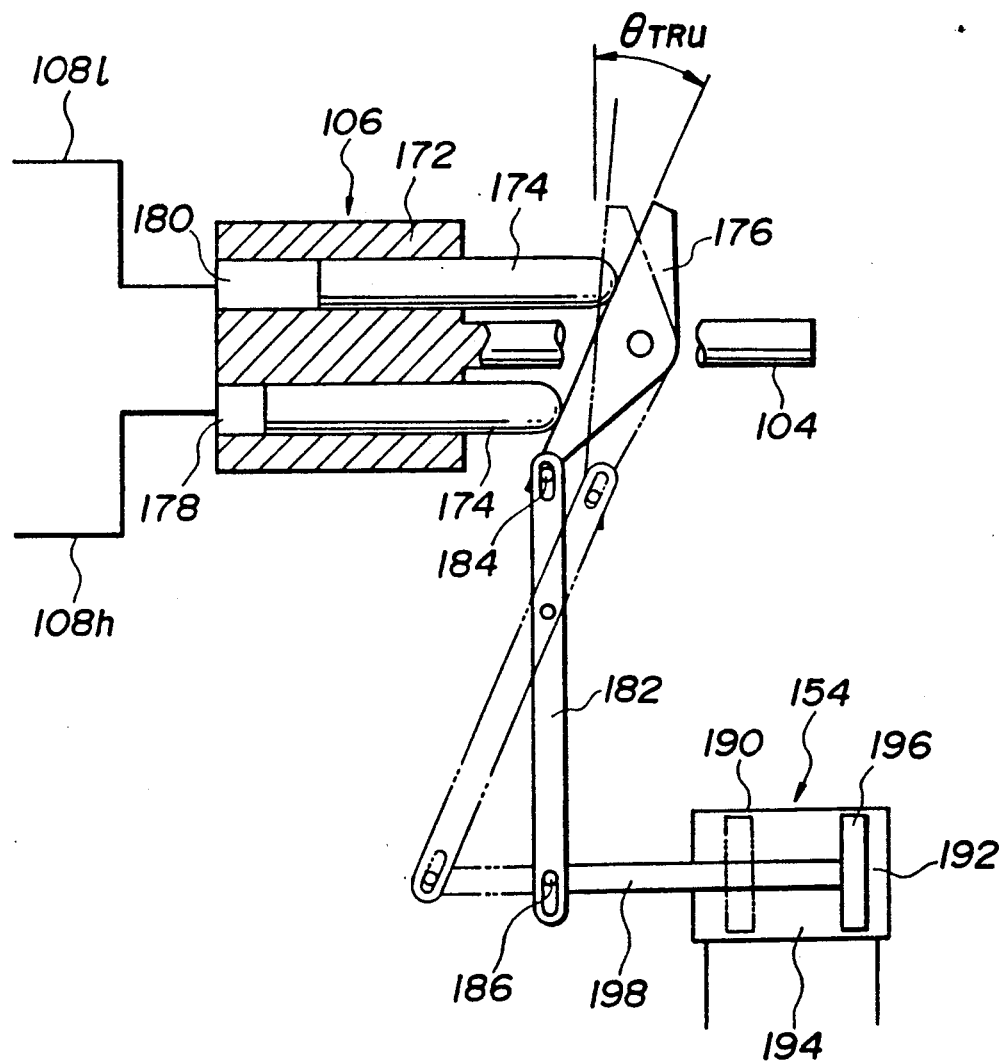
FIG. 17 is a magnified sectional view showing the structure of a hydraulic axial piston motor used in the system of FIG. 16.

The hydraulic motor 106 will now be explained with reference to FIG. 17. The hydraulic motor 106 is constituted as an axial piston motor variable in discharge capacity, for example. As shown in the figure, it comprises a cylinder block 172 which is connected with the drive shaft 104 and slidably accommodates a plurality of pistons 174 disposed in a ring-like formation centered on the axis of rotation of the drive shaft 104. An inclined plate 176 for defining the reciprocal stroke of the pistons 174 is disposed opposite the pistons so as to be variable in its angle of inclination $\theta TRU$. The cylinder chamber(s) 178 associated with each piston executing an extension stroke is connected with the high-pressure hydraulic line 108h and the cylinder chamber(s) 180 associated with each piston executing a retraction stroke is connected with the low-pressure hydraulic line 108l. As a result, the high-pressure fluid discharged by the hydraulic pump 102 is received by the cylinder chamber(s) 178 and low-pressure fluid discharged from the cylinder chamber(s) 180 is returned to the hydraulic pump 102, and the cylinder block 172 and the drive shaft 104 are rotatably driven by the reaction torque received by the pistons 174 from the inclined plate 176 in the course of this operation.

Further, since the capacity of the hydraulic motor 106 is determined by the stroke of the pistons 174, the speed ratio (corresponding to the gear ratio G/R) can be continuously varied from maximum to minimum by varying the angle of inclination $\theta TRU$ of the inclined plate 176 from the maximum indicated in solid lines in the figure to the minimum indicated by chain lines. In this case, the speed ratio is represented by;

Speed ratio = Output speed (rpm)/input speed(rpm)
= Pump capacity/motor capacity One end of the inclined plate 176 is connected with one end of a swingable link 182 via a pin 184 and the other end of the swingable link 182 is connected with a piston rod 198 of the hydraulic cylinder 154 via a second pin 186.

The hydraulic cylinder 154 comprises a cylinder 190, a piston 196 which is slidably accommodated in the cylinder 190 so as to divide the interior thereof into a head chamber 192 and a rod chamber 194, and the piston rod 198, which is formed integrally with the piston 196. Since the distal end of the piston rod 198 is connected with one end of the swingable link 182 via the pin 186, the angle of inclination $\theta TRU$ of the inclined plate 176 becomes maximum when the piston 196 is at its far right position, which causes the capacity of the hydraulic motor 106 to become maximum and the speed ratio to become minimum. On the other hand, when the piston 196 moves to the far left, the inclined plate 176 assumes the minimum angle position shown in chain lines, whereby the motor capacity becomes minimum and the speed ratio becomes maximum.

Returning to FIG. 16, an explanation will now be made regarding pilot valves for controlling the aforesaid hydraulic cylinders. The servo cylinder 150 described earlier is provided with a solenoid pilot valve 200. The pilot valve 200 is provided with a fluid line 202 connected with the head chamber 158 of the servo cylinder 150, a fluid line 204 connected with the rod chamber 160 of the servo cylinder 150, a fluid supply line 206 connected with the outlet of the auxiliary pump 114 and a fluid return line 208 connected with the tank 122, and has a sleeve 210 and a spool 212 movable within the sleeve 210. Further, the piston rod 164 of the servo cylinder 150 is connected with the sleeve 210 via a link 214 so as to feed back the movement of the piston of the servo cylinder 150 to the pilot valve 200.

The spool 212 is movable left and right between three positions, one of which is a neutral position. Furthermore, the spool 212 is movable left and right by a prescribed amount, which will be later explained with respect to another pilot valve. When the spool moves to the left, the hydraulic discharge of the auxiliary pump 114 is applied to the head chamber 158 of the servo cylinder 150 and the rod chamber 160 of the servo cylinder 150 is communicated with the tank 122, whereby the piston 162 moves to the left to close the clutch valve 112, as explained earlier. When the spool 212 moves to the right, the hydraulic discharge pressure is applied to the rod chamber 160 of the servo cylinder 150 and the head chamber 158 is communicated with the tank 122, whereby the piston 162 moves right to open the clutch valve 112. As the cylinder 150 is a servo cylinder, sleeve 210 can be moved to and stopped at the appropriate position by the movement of the piston 162 transmitted through the piston rod 164 and the link 214. With this mechanism, by causing the piston 162 to move in accordance with the amount of movement of the spool 212, the degree of opening of the clutch valve 112, namely the degree of opening of the short circuit line 110, can be controlled as desired.

A second pilot valve 220 for controlling the hydraulic cylinder 154 will now be explained. The pilot valve 220 is similar to the pilot valve 200 just described and is disposed between a fluid line 222 connected with the head chamber 192 of the hydraulic cylinder 154, a fluid line 224 connected with the rod chamber 194, and the aforesaid fluid supply line 206 for applying the discharge pressure of the auxiliary pump 114 and a fluid line 226 for communication with the tank 122. The pilot valve 220 has a sleeve 228 and a spool 230 movable therein. The spool 230 is movable left and right between three positions, one of which is a neutral position. More specifically, when the spool 230 moves to the left, the high-pressure operating fluid is applied to the head chamber 192 of the hydraulic cylinder 154 and is discharged from the rod chamber 194 so that the piston 196 and the piston rod 198 move to the left, whereby, as was explained earlier, the angle of inclination of the inclined plate 176 becomes smaller, the capacity of the hydraulic motor 106 becomes smaller and the speed ratio becomes larger. In contrast, when the spool 230 moves right, operating fluid is discharged from the head chamber 192 and is introduced into the rod chamber 194, whereby the piston 196 and the piston rod 198 move to the right, causing the angle of inclination of the inclined plate 176 to increases, the capacity of the hydraulic motor 106 to become larger and the speed ratio to become smaller. Moreover, the spool 230 is able to move to the left and right by a prescribed amount in a known manner such as by hydraulic force, spring force or duty control of a solenoid valve. Namely, what this means is that a prescribed degree of throttling is caused for changing fluid flow and a fluid flow rate. Thus, the pressure distribution between the head chamber 192 and the rod chamber 194 is determined by the amount of throttling by the pilot valve 220 (i.e. by the position of the spool), and the piston 196 and the piston rod 198 operate at a speed proportional to the difference in pressure between the two chambers. As a result, the capacity of the hydraulic motor 106 is varied, enabling the speed ratio (corresponding to the gear ratio G/R) to be varied as desired.

The pilot valves 200 and 220 are further connected with the transmission control unit 60, which moves the spools 212, 230 to the desired positions by energizing/deenergizing the pilot valve solenoids. More specifically, similarly to the case of the first embodiment, the transmission control unit 60 receives the outputs of the throttle position sensor 50, crankshaft angle sensor 52, slope angle sensor 54 and vehicle speed sensor 56 as inputs, and uses the input values to compute control values in a manner to be described later. The computed control values are used to control power transmission/cutoff via the pilot valve 200 and to control the speed ratio as desired via the pilot valve 220. The transmission control unit 60 also controls the operation of the range drive mechanism 152, which includes a hydraulic cylinder, so as to establish, via a link 170 or the like, in the forward/reverse switching device 130 a gear train for forward or reverse travel in accordance with an F (Forward), N (Neutral) or R (Reverse) signal produced depending on the position of a manual shift lever (not shown) located on the floor of the vehicle in the vicinity of the driver's seat. This range position data is of course also input to the transmission control unit 60 via the range selector switch 62. No detailed explanation has been made in the forgoing, for the reason that this embodiment of the invention relates primarily to fuzzy control of a continuously variable transmission and not to a continuously variable transmission per se.

The operation of the transmission control unit according to the fourth embodiment of the invention will now be explained with reference to FIG. 18 and later figures. The explanation will concentrate on the points in which the fourth embodiment differs from the first. For example, since the transmission control unit of the fourth embodiment is similar to that of the first embodiment shown in FIG. 2, no further explanation will be made here. The preparatory work required for the formulation of rules an the like prior to actual implementation is also similar to that in the first embodiment.

Figure 18:
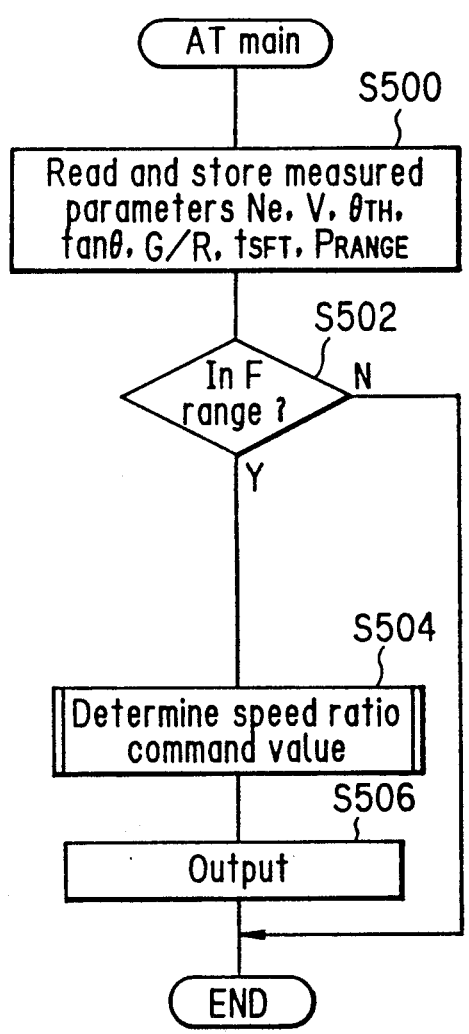
FIG. 18 is a main routine flowchart showing the operation of a speedchange control unit of the control system of FIG. 16.

FIG. 18 is a main flowchart outlining the transmission control in accordance with the fourth embodiment. In the first step 500, the detected parameter values are read and stored in memory. The current gear ratio G/R (speed ratio) is computed from the ratio between the input and output speeds (rpm) of the transmission, similarly as in the first embodiment. The procedure then moves to step S502 in which it is determined whether or not the transmission is in the forward range (the aforesaid F range) and if the result is YES, the procedure moves to step S504 in which the speedratio command value is determined and then to step S506 in which output processing is conducted. If it is found in step S502 that the transmission is not in the forward range, the program is immediately discontinued.

Figure 19:
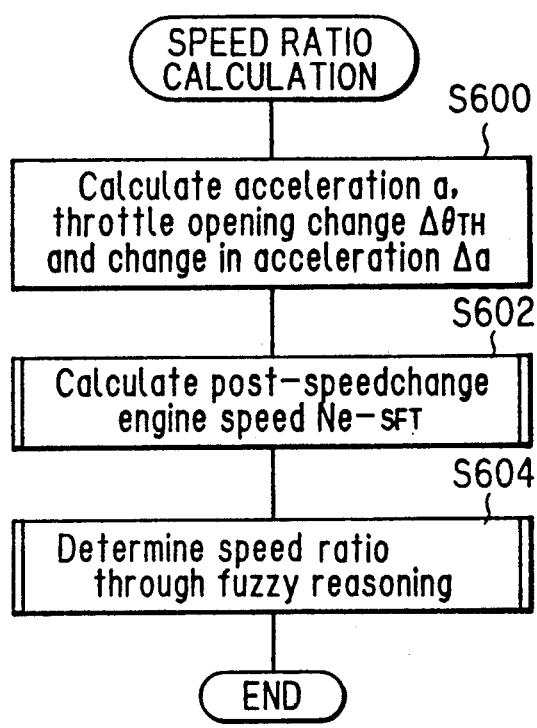
FIG. 19 is a flowchart showing a subroutine of the flowchart of FIG. 18, for determining a speedchange command value.

FIG. 19 is a flowchart showing a routine for determining the speed ratio command value in step S504 of the flowchart of FIG. 18. In FIG. 19, after the acceleration a and the like have been computed in step S600 in the same manner as in the first embodiment, the procedure moves to step S602 in which an post-speedchange engine speed is calculated in a manner similar to the post-gearshift engine speed in the first embodiment.

Figure 20:
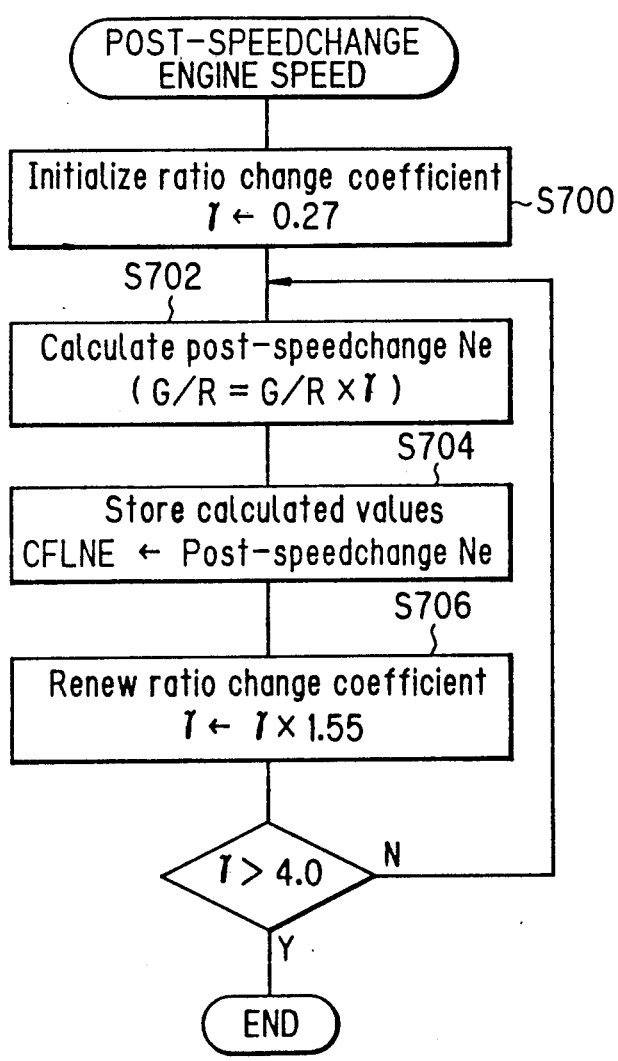
FIG. 20 is a flow chart showing a subroutine of the flowchart in FIG. 16, for computing a post-speedchange engine speed.

FIG. 20 is a flowchart of the procedures for this calculation. First in step S700, a ratio change coefficient Gamma is initialized. More concretely, a counter for counting this coefficient is initialized.

Figure 21:
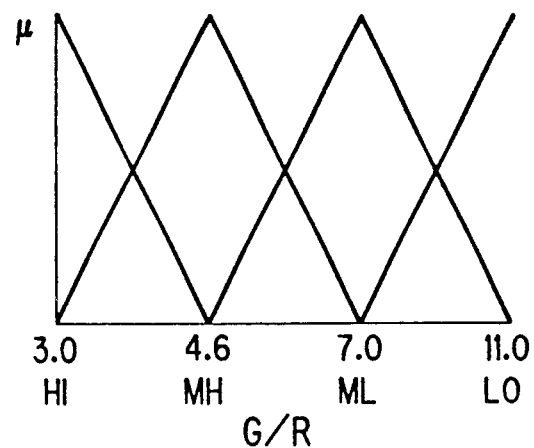
FIG. 21 is a graph for explaining membership values of a speedchange ratio used in the fourth embodiment.

Before continuing with an explanation of the remaining procedures, it will be helpful to give a general explanation of the control according to the present embodiment. Since the present embodiment relates to control in the continuously variable transmission, it uses the concept of speed ratio instead of the concept of gearshift position employed in the first embodiment, and the target speed ratio is sequentially determined by inference. Moreover, this inference of the speed ratio is not direct but is carried out indirectly through inference of a coefficient (the aforesaid ratio change coefficient Gamma) which changes the speed ratio. Specifically, the calculation Target speed ratio $(G/R)$ = Current speed ratio $(G/R)$ × Ratio change coefficient Gamma is made. Further, the speed ratio (G/R) is represented in terms of overall speed reduction ratio as shown in FIG. 21 and is assigned on the universe of discourse extending from 3.0 (the high side) to 11.0 (the low side) which is divided into fuzzy sets, as depicted. In the figure, the fuzzy label HI means "change the ratio large toward the high side", MH means "change the ratio moderately toward the high side", ML means "change the ratio small toward the low side" and LO means "change the ratio large toward the low side".

Figure 22:
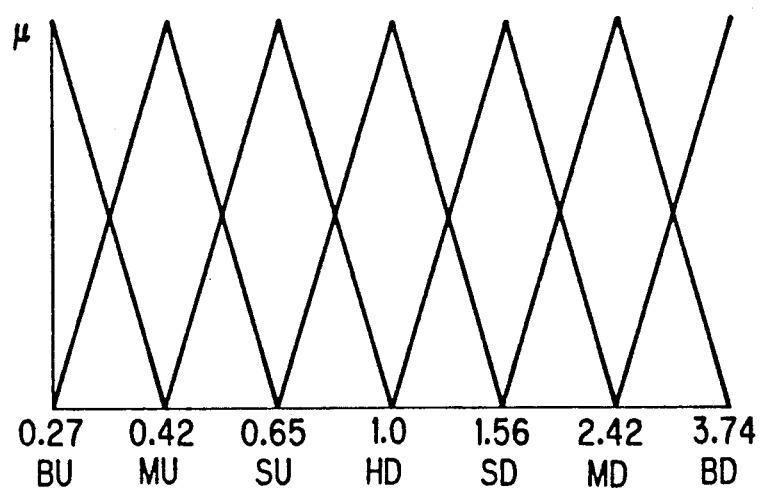
FIG. 22 is a graph for explaining membership values of a ratio change coefficient used in the fourth embodiment.

Further, as shown in FIG. 22, seven fuzzy sets for the ratio change coefficient are defined between 0.27 and 3.74. In this figure, the fuzzy label BU means "large toward the high side", MU means "moderately toward the high side", SU means "small toward the high side", HD means "hold current speed ratio", SD means "small toward the low side", MD means "moderately toward the low side" and BD means "large toward the low side".

Thus, the initialization in step S700 in FIG. 20 means setting the counter showing the ratio change coefficient Gamma to the highest value on the high side, namely to 0.27.

The procedure then advances to step S702 in which the aforesaid post-speedchange engine speed is calculated. This calculation is carried out for a plurality of points. Specifically, the current ratio is multiplied by each of the seven values of the ratio change coefficient Gamma which are assigned a grade value of Mu 1.0 in FIG. 22, namely by 0.27, 0.42, 0.65, 1.0, 1.56, 2.42 and 3.74, whereby a post-speedchange engine speed is calculated for these values respectively.

The procedure then moves to step S704 in which the calculated post-speedchange engine speed is stored at the pertinent address CFLNE (where FL means the aforesaid HI, MH, ML, LO). The reason for there being assigned only four FLs indicating the speedchange ratio, as against 7 ratio change coefficients Gamma, is that when, for example, the current engine speed is on the extreme low side it cannot go further toward the low side. A similar consideration applies when it is on the extreme high side.

The procedure then advances to step S706 in which the ratio change coefficient Gamma of the counter is rewritten to the current value multiplied by a value 1.55, which nearly equals to a common ratio of the aforesaid geometric sequence of 0.27, 0.42, 0.65, . . . 3.74. This calculation of the post-speedchange engine speed is repeated for each of the aforesaid values of the ratio change coefficient Gamma until it has been confirmed in step S708 that the extreme low side value of 3.74 has been reached.

Returning to FIG. 19, the procedure moves to the final step S604 in which the target speed ratio is decided by fuzzy reasoning.

Figure 23:
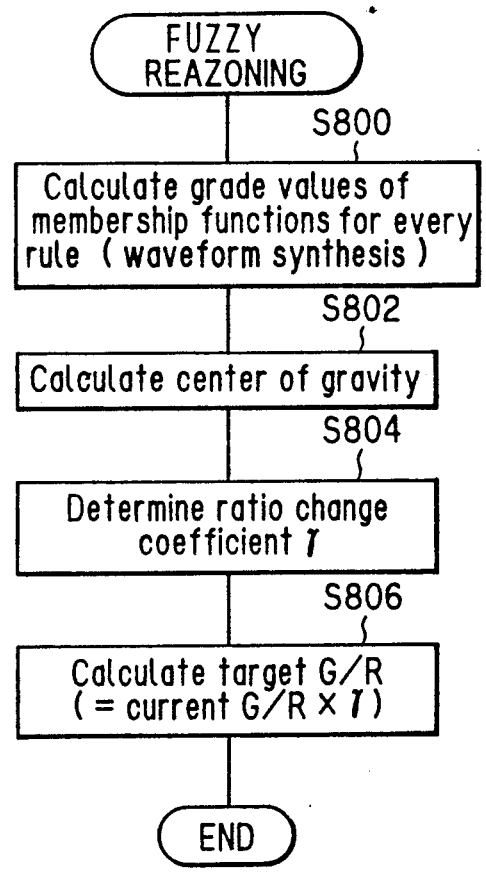
FIG. 23 is a flowchart showing a subroutine of the flowchart of FIG. 19, for carrying out fuzzy reasoning.

FIG. 23 is the flowchart of a subroutine for this purpose. First, in step S800, grade values of the membership functions are calculated for every rule and the values of the conclusions are summed in a known manner such as by waveform synthesis, which will be explained in more detail later. Next, in step 802, the center of gravity of the synthesized waveforms is calculated whereafter, in step S804, the ratio change coefficient Gamma is obtained from the value at the intersection of a line drawn from the center of gravity perpendicular to the universe of discourse. Then in step S806, the target speed ratio (G/R) is calculated.

FIGS. 24(a) to 24(h) list the 43 rules used in this fourth embodiment. The difference between these rules and those of FIGS. 9(a) to 9(h) for the first embodiment is that the speed ratio (G/R) is used instead of the gear position and that the conclusions are expressed in terms of the ratio change coefficient Gamma, so that no explanation is made on the rules. The control toughness is calculated discretely for each of the four values of the post-speedchange engine speed which are actually possible among those obtained for the seven values of the ratio change coefficient Gamma and the one of these calculated control toughness values which is that for the amount of speedchange indicated in the conclusion of the rule concerned is retrieved and the degree to which it satisfies the same rule is evaluated. Thus in this point too, the fourth embodiment is the same as the first.

Figure 25:
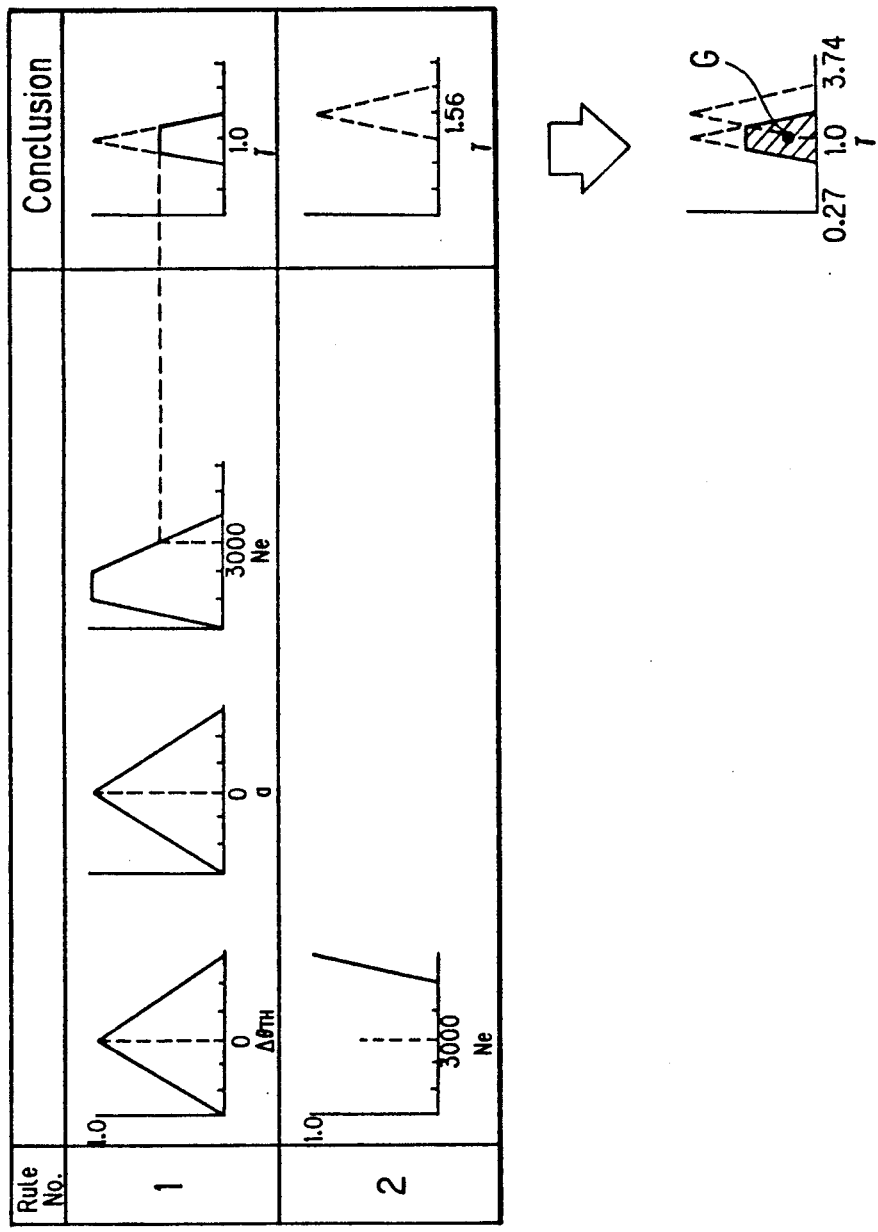
FIG. 25 is a chart for explaining the fuzzy reasoning in the fourth embodiment.

The fuzzy reasoning of the first embodiment employs mini-max computation whereby the rule with the highest grade value is selected and the gearshift command value is determined in accordance with the conclusion of the selected rule. In the present embodiment, however, the waveforms are synthesized after the mini values have been obtained and the speed command value is determined from the center of gravity of the synthesized waveform. This process will be explained with reference to FIG. 25.

Let the engine speed Ne be 3,000 rpm, the throttle opening change be zero and the acceleration be zero. In calculating the grade value for Rule 1 under these conditions, the grade value of the engine speed is found to be 0.5. Truncating the waveform of the conclusion at this position produces a trapezoid, as shown in the figure. In the case of Rule 2, on the other hand, since the vertical raised at the value of 3,000 rpm does not intersect the waveform, no waveform remains in the conclusion. When the aforesaid results are transferred to a common universe of discourse as shown at the bottom of the same figure, there is obtained the trapezoid indicated by hatching. The center of gravity of this trapezoid is then found and a vertical line is drawn downward therefrom. The value at the point of intersection with the universe of discourse is the conclusion which, in the case under discussion is, Gamma=1.0. While this process has been discussed here only with respect to Rules 1 and 2, it is likewise carried out for all of the rules up to Rule 43. All of the waveforms obtained are synthesized and the center of gravity of the final synthesized waveform is obtained. It should be noted, however, that since each rule supposes a different set of operating conditions, only 2 or 3 among all of the rules processed by fuzzy reasoning will have waveforms in their conclusions so that the number of waveforms that have to be synthesized will generally be small.

Output processing is then carried out in step S506 of the main flowchart of FIG. 18 on the basis of the result obtained in the foregoing manner. Thus the solenoid pilot valve 220 is driven to change the capacity of the hydraulic motor 106 and control the speed ratio to the desired value.

As a result of the aforesaid arrangement of this embodiment, fuzzy reasoning can be applied to control the speed ratio of a continuously variable transmission so as to enable the speedchange judgments and operations of an expert driver operating a vehicle with a manually shifted transmission to be introduced into the control of a continuously variable transmission, whereby it becomes possible to realize smooth speedchange characteristics that do not give the driver a feeling of business and further becomes possible to respond appropriately to the need for emission countermeasures and to the desires of individual drivers.

While in the present embodiment fuzzy reasoning was applied to the speed ratio, it is alternately possible to carry out the computations with respect to, for example, the rate of change in the speed ratio. Further, the invention is not limited in application to a continuously variable transmission employing the axial piston pump but may be equally well applied to one using a pulley or the like.

While the embodiments of the invention described in the foregoing relate to a multi-step transmission and a continuously variable transmission, the present invention is also applicable to a traction control or the like.

What is claimed is:

1. A system for controlling a vehicle automatic multi-step geared or continuously variable transmission, comprising:

first means for detecting operating conditions of the vehicle including engine speed, degree of throttle opening, change in the throttle opening degree, vehicle speed, change in the vehicle speed and gear ratio currently engaged;

second means for predicting, with respect to gear ratios to which it is possible to shift from the gear ratio currently engaged, reserve motive force available and change in the engine speed, which would occur upon shifting to each of said gear ratios not currently engaged;

third means for establishing a membership function of a fuzzy set of detected and predicted parameters including the detected operating conditions of the vehicle, in accordance with a plurality of predetermined fuzzy production rules defining gear ratio shifting;

fourth means for carrying out fuzzy reasoning based on the rules using the detected and predicted parameters to determine a gear ratio to be shifted to; and actuator means for driving a gear ratio shift mechanism in response to the determined gear ratio.

2. A system according to claim 1, wherein said reserve motive force is used in at least one of the rules which defines upshifting.

3. A system according to claim 1, wherein said reserve motive force available is calculated from a gradient of a road surface on which the vehicle is traveling.

4. A system according to claim 1, 2, or 3, wherein said fourth means carries out fuzzy reasoning on a ratio change coefficient and determines the gear ratio to be shifted to, by multiplying the gear ratio currently engaged by the ratio change coefficient.

5. A system according to claim 1, 2, or 3, wherein said rules are established on the basis of an analysis of judgments and feelings of a driver of a vehicle with a manually shifted transmission.

6. A system for controlling a vehicle automatic transmission, comprising:

first means for determining operating conditions of the vehicle including degree of throttle opening, vehicle speed, and gear ratio currently engaged;

second means for establishing a membership function of a fuzzy set for each of a plurality of parameters from the determined operating conditions in accordance with a plurality of predetermined fuzzy production rules defining a plurality of respective gear ratio shifting conclusions;

third means for carrying out fuzzy reasoning based on the fuzzy production rules to determined said respective gear ratio shifting conclusions and to determine a target gear ratio shift based on the gear ratio shifting conclusions from the gear ratio currently engaged; and actuator means for driving a gear ratio shift mechanism in response to the determined target gear ratio shift.

7. A system according to claim 6, wherein said third means determines the target gear ratio by calculating the membership function of the rules to select one rule and wherein the calculated membership function is then compared with a prescribed value and if the calculated membership function is found to be not larger than the prescribed value, the selection of said one rule is cancelled.

8. A system according to claim 6, wherein said rules include a rule whose membership function complements that of another rule.

9. A system according to claim 6, wherein said membership function has a maximum membership function which differs among said rules.

10. A system according to claim 9, wherein said rule assigned the maximum membership function is a rule for protecting the engine from damage.

11. A system according to claim 7, 8, 9, 10 or 6 wherein said rules are established on the basis of an analysis of judgments and feelings of a driver of a vehicle with a manually shifted transmission.

* * * * *